United States Patent
Staser et al.

(10) Patent No.: US 12,233,959 B2
(45) Date of Patent: Feb. 25, 2025

(54) APPARATUS AND METHOD FOR STOWING AND DEPLOYING A VEHICLE TIRE

(71) Applicant: INTEVA PRODUCTS, LLC, Troy, MI (US)

(72) Inventors: Brian H. Staser, Oxford, CT (US); Francis C. Strasek, Rocky River, OH (US); Kenneth Gassman, Lake Orion, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 0 days.

(21) Appl. No.: 17/827,368

(22) Filed: May 27, 2022

(65) Prior Publication Data

US 2022/0363324 A1    Nov. 17, 2022

Related U.S. Application Data

(63) Continuation-in-part of application No. PCT/US2021/017690, filed on Feb. 11, 2021.
(Continued)

(51) Int. Cl.
*B62D 43/04* (2006.01)
(52) U.S. Cl.
CPC ................... *B62D 43/045* (2013.01)
(58) Field of Classification Search
CPC .................................................. B62D 43/045
(Continued)

(56) References Cited

U.S. PATENT DOCUMENTS

| 5,197,641 A * | 3/1993 | Montgomery, Jr. | B62D 43/002 |
| | | | 414/466 |
| 5,238,358 A * | 8/1993 | Higgins | B62D 43/045 |
| | | | 414/463 |

(Continued)

FOREIGN PATENT DOCUMENTS

| DE | 19852770 C1 | 5/2000 |
| SU | 1054172 A1 | 11/1983 |

(Continued)

OTHER PUBLICATIONS

International Preliminary Report on Patentability mailed Aug. 25, 2022; International Application No. PCT/US2021/017690; 6 pages.
(Continued)

*Primary Examiner* — Peter N Helvey
(74) *Attorney, Agent, or Firm* — CANTOR COLBURN LLP

(57) ABSTRACT

An apparatus for stowing and deploying a vehicle tire from a rear portion of a vehicle, the apparatus including: a raising and lowering mechanism for moving the tire a stowed position to a deployed position, wherein the tire when in the deployed position is lowered and extended laterally in order to provide access to the tire. An apparatus for stowing and deploying a vehicle tire from a rear portion of a vehicle, the apparatus including: a raising and lowering mechanism for moving the vehicle tire a stowed position to a deployed position, wherein the raising and lowering mechanism has a feature that is configured to be engaged by an adapter of a hand held power driver so that the vehicle tire can be stowed and deployed via the hand held power driver. An apparatus for stowing and deploying a vehicle tire from a rear portion of a vehicle, the apparatus including: a raising and lowering mechanism for moving the vehicle tire between a stowed position and a deployed position, wherein the raising and lowering mechanism has a fixture that releasably engages a (Continued)

rim of the vehicle tire, the feature having a first configuration where the fixture engages opposite sides of the rim of the vehicle tire and a second configuration where portions of the fixture can pass through an opening in the rim of the vehicle tire.

12 Claims, 19 Drawing Sheets

Related U.S. Application Data

(60) Provisional application No. 62/972,917, filed on Feb. 11, 2020, provisional application No. 63/194,065, filed on May 27, 2021, provisional application No. 63/194,049, filed on May 27, 2021.

(58) Field of Classification Search
USPC .......................................... 224/42.21, 42.23
See application file for complete search history.

(56) References Cited

U.S. PATENT DOCUMENTS

| | | | | |
|---|---|---|---|---|
| 5,297,913 A * | 3/1994 | Au | ....................... | B62D 43/045 414/463 |
| 5,718,553 A * | 2/1998 | Via | ...................... | B62D 43/045 414/463 |
| 5,975,498 A * | 11/1999 | Sauner | ................. | B62D 43/045 254/323 |
| 5,993,133 A * | 11/1999 | Murray | ................ | B62D 43/045 414/919 |
| 6,427,884 B1 * | 8/2002 | Hutter | .................. | B62D 43/002 224/538 |
| 7,431,268 B2 * | 10/2008 | Steiner | ..................... | B66D 1/12 254/323 |
| 8,936,427 B2 * | 1/2015 | Reznar | ................. | B62D 43/045 254/323 |
| 2009/0035108 A1 * | 2/2009 | Warner | ................ | B62D 43/045 414/463 |

FOREIGN PATENT DOCUMENTS

SU             1630948 A1     2/1991
WO       2013078521 A1     6/2013

OTHER PUBLICATIONS

International Search Report for International Application No. PCT/US2021/017690: Date of Completion: Jun. 22, 2021; Date of Mailing: Jun. 24, 2021; 2 Pages.

Written Opinion for International Application No. PCT/US2021/017690; Date of Completion: Jun. 22, 2021; Date of Mailing: Jun. 24, 2021; 4 Pages.

* cited by examiner

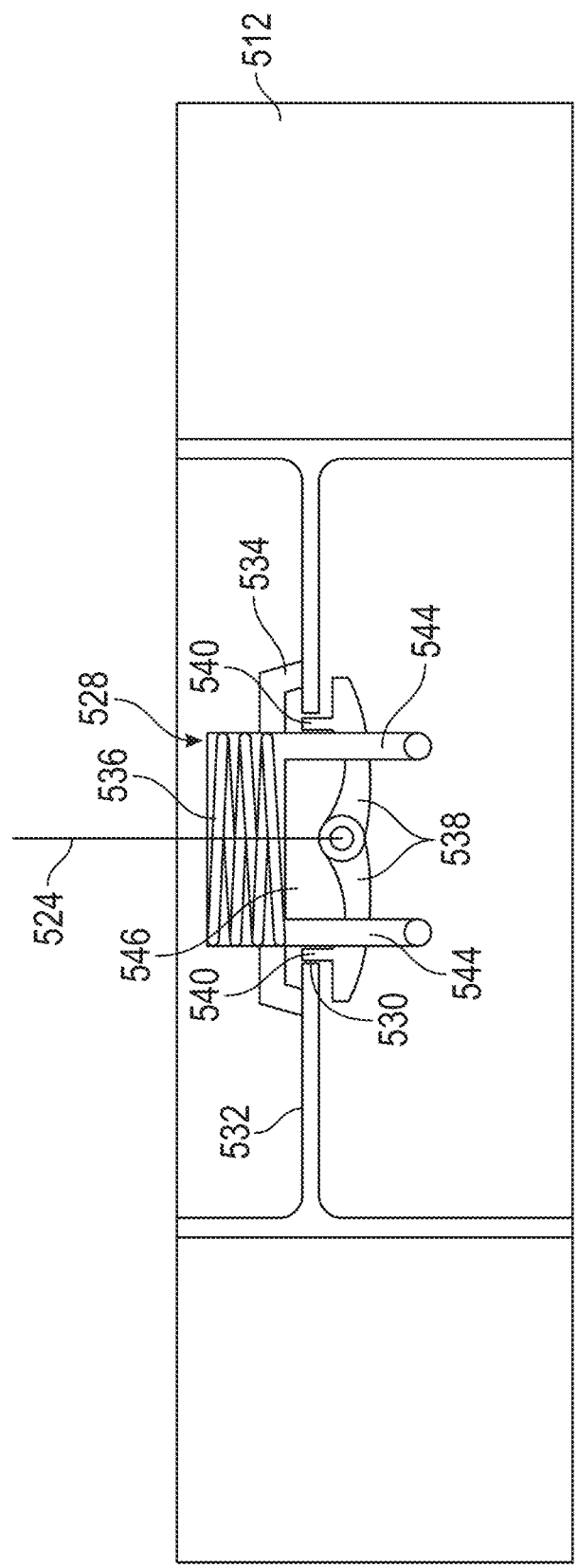

APPARATUS AND METHOD FOR STOWING AND DEPLOYING A VEHICLE TIRE

CROSS REFERENCE TO RELATED APPLICATIONS

This application is a continuation in part of PCT Application No. PCT/US2021/017690 filed on Feb. 11, 2021, which claims priority to U.S. Provisional Application Ser. No. 62/972,917 filed on Feb. 11, 2020, the entire contents of which are incorporated herein by reference thereto.

This application also claims priority to U.S. Provisional Patent Application Ser. No. 63/194,065 filed on May 27, 2021, the entire contents of which are incorporated herein by reference thereto.

This application also claims priority to U.S. Provisional Patent Application Ser. No. 63/194,049 filed on May 27, 2021, the entire contents of which are incorporated herein by reference thereto.

BACKGROUND

Exemplary embodiments of the present disclosure pertain to vehicle spare tires and more particularly, an apparatus and method for stowing and deploying a vehicle tire.

Current underbody spare tire storage systems require the use of a mechanical crank to manually lower the spare tire. The mechanical crank may be retrieved from a jack kit installed into a feature in the rear of the vehicle. Through the use of this mechanical crank the spare tire is lowered by a cable system so that the spare tire ends up on the ground directly below where it was stored. Depending on the type of vehicle, this position could be 2 to 3 feet under the vehicle making it very difficult for an individual to access without getting down on their hands and knees and almost crawling under the vehicle to retrieve the lowered spare tire. For larger vehicles such as sport utility vehicles (SUVs) and pick-up trucks this tire can be very large and thus very heavy making it hard to move from underneath the vehicle. As such, some individuals may find themselves unable to retrieve the tire from under the vehicle.

In other applications, the mechanical crank may be retrieved from a jack kit installed into a feature in the rear of the vehicle. The mechanical crank when retrieved from the jack kit is installed into a feature in the rear of the vehicle that allows the user to manually lower the tire. The jack also requires a feature on the manual crank to manually lift the vehicle and an adapter or separate lever is provide to manually remove the lug nuts holding the tire to the vehicle.

In other applications, the mechanical crank may be retrieved from a jack kit installed into a feature in the rear of the vehicle. The mechanical crank when retrieved from the jack kit is installed into a feature in the rear of the vehicle that allows the user to manually lower the tire via a cable system so that the tire ends up on the ground directly below where it was lowered. The tire is then pulled manually to the rear of the vehicle where enough slack must be generated in the cable system to allow the tire to be lifted and for a bracket that is larger than the hole in the wheel to be turned 90 degrees and fed back through the hole to free the tire from the cable system. This final manipulation is difficult to perform and has the potential to be improved.

Accordingly, it is desirable to provide an apparatus and method for stowing and deploying a vehicle tire such that the tire can be easily retrieved once it is deployed. As such, it is desirable to provide a more efficient system to support tire changing.

BRIEF DESCRIPTION

Disclosed is an apparatus for stowing and deploying a vehicle tire from a rear portion of a vehicle, the apparatus including: a raising and lowering mechanism for moving the tire a stowed position to a deployed position, wherein the tire when in the deployed position is lowered and extended laterally in order to provide access to the tire.

In addition to one or more of the features described above, or as an alternative to any of the foregoing embodiments, the raising and lowering mechanism including a motor for winding and unwinding a cable from a drum.

In addition to one or more of the features described above, or as an alternative to any of the foregoing embodiments, the cable is secured to a fixture at one end and the drum at another end, the fixture being configured to prevent it from passing through an opening in a rim of the tire when there is tension on the cable and allow it to be manipulated and pass through the opening in the rim of the tire when there is slack in the cable.

In addition to one or more of the features described above, or as an alternative to any of the foregoing embodiments, the raising and lowering mechanism also includes a swing cable, the swing cable being secured to the fixture at one end and another portion of the vehicle at another end, the swing cable having a fixed length such that as the raising and lowering mechanism lowers the tire from the stowed position to the deployed position the tire swings laterally from the stowed position until it rests upon a surface.

In addition to one or more of the features described above, or as an alternative to any of the foregoing embodiments, the apparatus further includes a latch in order to retain the tire in the stowed position.

In addition to one or more of the features described above, or as an alternative to any of the foregoing embodiments, a switch is provided to operate the raising and lowering mechanism as well as the latch.

In addition to one or more of the features described above, or as an alternative to any of the foregoing embodiments, the raising and lowering mechanism further comprises a four bar swing having a plurality of arms with curved ends, the curved ends being pivotally secured to a cross bar and opposite ends of the plurality of arms are pivotally secured to another portion of the vehicle at another end.

In addition to one or more of the features described above, or as an alternative to any of the foregoing embodiments, the plurality of arms have a fixed length such that as the raising and lowering mechanism lowers the tire from the stowed position to the deployed position the tire swings laterally from the stowed position until it rests upon a surface.

In addition to one or more of the features described above, or as an alternative to any of the foregoing embodiments, the apparatus includes a latch in order to retain the tire in the stowed position.

In addition to one or more of the features described above, or as an alternative to any of the foregoing embodiments, a switch is provided to operate the raising and lowering mechanism as well as the latch.

In addition to one or more of the features described above, or as an alternative to any of the foregoing embodiments, the latch is configured to releaseably engage a portion of one of the plurality of arms.

In addition to one or more of the features described above, or as an alternative to any of the foregoing embodiments, the raising and lowering mechanism includes a motor for winding and unwinding a cable from a drum.

In addition to one or more of the features described above, or as an alternative to any of the foregoing embodiments, the cable is secured to a fixture at one end and the drum at another end, the fixture being configured to prevent it from passing through an opening in a rim of the tire when there is tension on the cable and allow it to be manipulated and pass through the opening in the rim of the tire when there is slack in the cable.

In addition to one or more of the features described above, or as an alternative to any of the foregoing embodiments, the raising and lowering mechanism includes a tire tray, the tire tray having a lower tray portion that is slidably mounted to the tire tray such that the lower tray portion slides laterally with respect to the tire tray when the tire tray is in the deployed position.

In addition to one or more of the features described above, or as an alternative to any of the foregoing embodiments, the raising and lowering mechanism includes a motor for winding and unwinding a cable from a drum.

In addition to one or more of the features described above, or as an alternative to any of the foregoing embodiments, the cable is secured to the tire tray at one end and the drum at the other end.

In addition to one or more of the features described above, or as an alternative to any of the foregoing embodiments, the apparatus includes a latch in order to retain the tire in the stowed position.

In addition to one or more of the features described above, or as an alternative to any of the foregoing embodiments, a switch is provided to operate the raising and lowering mechanism as well as the latch.

In addition to one or more of the features described above, or as an alternative to any of the foregoing embodiments, the raising and lowering mechanism includes a motor for winding and unwinding a first cable and a second cable from a dual diameter cable drum, wherein the first cable lowers the tire from the stowed position and the second cable moves the tire laterally from the stowed position.

Also disclosed is a method for stowing and deploying a vehicle tire from a rear portion of a vehicle, moving the tire a stowed position to a deployed position, wherein the tire moves laterally as it is moved from the stowed position to the deployed position.

In addition to one or more of the features described above, or as an alternative to any of the foregoing embodiments, the tire is moved between the stowed position and the deployed position by a raising and lowering mechanism that has a motor for winding and unwinding a cable from a drum.

Also disclosed is an apparatus for stowing and deploying a vehicle tire from a rear portion of a vehicle, the apparatus including: a raising and lowering mechanism for moving the vehicle tire a stowed position to a deployed position, wherein the raising and lowering mechanism has a feature that is configured to be engaged by an adapter of a hand held power driver so that the vehicle tire can be stowed and deployed via the hand held power driver.

In addition to one or more of the features described above, or as an alternative to any of the foregoing embodiments, the adapter of the hand held power driver is configured to engage a feature of a vehicle jack in order to raise and lower the vehicle jack.

In addition to one or more of the features described above, or as an alternative to any of the foregoing embodiments, the adapter of the hand held power driver is configured to engage lug nuts of a vehicle tire in order to install and remove the lug nuts.

Also disclosed is a method for stowing and deploying a vehicle tire from a rear portion of a vehicle, the method including: moving the vehicle tire between a stowed position and a deployed position with a raising and lowering mechanism, wherein the raising and lowering mechanism has a feature that is configured to be engaged by an adapter of a hand held power driver so that the vehicle tire can be stowed and deployed via the hand held power driver.

In addition to one or more of the features described above, or as an alternative to any of the foregoing embodiments, the adapter of the hand held power driver is configured to engage a feature of a vehicle jack in order to raise and lower the vehicle jack.

In addition to one or more of the features described above, or as an alternative to any of the foregoing embodiments, the adapter of the hand held power driver is configured to engage lug nuts of a vehicle tire in order to install and remove the lug nuts.

Also disclosed is an apparatus for stowing and deploying a vehicle tire from a rear portion of a vehicle, the apparatus including: a raising and lowering mechanism for moving the vehicle tire between a stowed position and a deployed position, wherein the raising and lowering mechanism has a fixture that releasably engages a rim of the vehicle tire, the feature having a first configuration where the fixture engages opposite sides of the rim of the vehicle tire and a second configuration where portions of the fixture can pass through an opening in the rim of the vehicle tire.

In addition to one or more of the features described above, or as an alternative to any of the foregoing embodiments, the fixture includes a clamping plate, a nut and a pair of pivoting arms.

In addition to one or more of the features described above, or as an alternative to any of the foregoing embodiments, the pair of pivoting arms are pivotally secured to the a cable.

In addition to one or more of the features described above, or as an alternative to any of the foregoing embodiments, the nut threadingly engages a complimentary threaded opening of the clamping plate.

In addition to one or more of the features described above, or as an alternative to any of the foregoing embodiments, the clamping plate is larger than the opening in the rim.

In addition to one or more of the features described above, or as an alternative to any of the foregoing embodiments, the pair of pivoting arms have features that engage sides of the opening in the rim.

In addition to one or more of the features described above, or as an alternative to any of the foregoing embodiments, the fixture includes a scissor expansion system.

In addition to one or more of the features described above, or as an alternative to any of the foregoing embodiments, the scissor expansion system includes a top plate, expandable linkage and a pair of arms.

In addition to one or more of the features described above, or as an alternative to any of the foregoing embodiments, the expandable linkage comprises a plurality of members each pivotally secured to a central member at one end and at least one other member at an opposite end.

In addition to one or more of the features described above, or as an alternative to any of the foregoing embodiments, the scissor expansion system includes a spring that biases the plurality of members and the pair of arms to a position where the fixture can pass through an opening in the rim of the vehicle tire.

Also disclosed is a method for stowing and deploying a vehicle tire from a rear portion of a vehicle, the method including: moving the vehicle tire between a stowed position and a deployed position with a raising and lowering mechanism, wherein the raising and lowering mechanism has a fixture that releasably engages a rim of the vehicle tire, the feature having a first configuration where the fixture engages opposite sides of the rim of the vehicle tire and a second configuration where portions of the fixture can pass through an opening in the rim of the vehicle tire.

In addition to one or more of the features described above, or as an alternative to any of the foregoing embodiments, the fixture includes a clamping plate, a nut and a pair of pivoting arms.

In addition to one or more of the features described above, or as an alternative to any of the foregoing embodiments, the pair of pivoting arms are pivotally secured to the a cable.

In addition to one or more of the features described above, or as an alternative to any of the foregoing embodiments, the nut threadingly engages a complimentary threaded opening of the clamping plate.

In addition to one or more of the features described above, or as an alternative to any of the foregoing embodiments, the clamping plate is larger than the opening in the rim.

In addition to one or more of the features described above, or as an alternative to any of the foregoing embodiments, the pair of pivoting arms have features that engage sides of the opening in the rim.

In addition to one or more of the features described above, or as an alternative to any of the foregoing embodiments, the fixture includes a scissor expansion system.

In addition to one or more of the features described above, or as an alternative to any of the foregoing embodiments, the scissor expansion system includes a top plate, expandable linkage and a pair of arms.

In addition to one or more of the features described above, or as an alternative to any of the foregoing embodiments, the expandable linkage comprises a plurality of members each pivotally secured to a central member at one end and at least one other member at an opposite end.

In addition to one or more of the features described above, or as an alternative to any of the foregoing embodiments, the scissor expansion system includes a spring that biases the plurality of members and the pair of arms to a position where the fixture can pass through an opening in the rim of the vehicle tire.

In addition to one or more of the features described above, or as an alternative to any of the foregoing embodiments, the raising and lowering mechanism includes a motor for winding and unwinding a first cable and a second cable from a dual diameter cable drum, wherein the first cable lowers the vehicle tire from the stowed position and the second cable moves the vehicle tire laterally from the stowed position.

In addition to one or more of the features described above, or as an alternative to any of the foregoing embodiments, the raising and lowering mechanism includes a fixture for releasably engaging a rim of the vehicle tire, the fixture is configured to releasably engage an opening of the rim, the fixture including: a main body portion configured to engage the opening of the rim of the vehicle tire; a pin slidably received within an opening of the main body portion; a flange portion secured to one end of the pin and a collar portion secured to the pin and located away from the flange portion, the flange portion is located at one side of the opening of the main body portion and the collar portion is located at an opposite side of the opening of the main body portion so that the pin can slide within the opening of the main body portion but not pass completely therethrough; a spring located between the flange portion and the main body portion, the spring being larger than the opening of the main body portion, the spring providing a biasing force between the pin and the main body portion; a cable fastener releasably secured to the pin by another pin that slidably engages an opening in the cable fastener and an opening in the pin such that the cable fastener can be releasably secured to the pin, the cable fastener being secured to at least one cable of the raising and lowering mechanism; and a pair of spring tabs secured to the main body portion, the spring tabs are capable of being deflected from the main body portion towards each other so that they can pass through the opening of the rim of the vehicle tire and then after a force biasing the spring tabs toward each other is removed after they are passed through the opening of the rim of the vehicle tire they will return to their an unbiased position and retain the main body portion to the rim of the vehicle tire.

In addition to one or more of the features described above, or as an alternative to any of the foregoing embodiments, the raising and lowering mechanism includes: a motor for winding and unwinding a first cable and a second cable from a dual diameter cable drum, wherein the first cable lowers the vehicle tire from the stowed position and the second cable moves the vehicle tire laterally from the stowed position; a fixture for releasably engaging a rim of the vehicle tire, the fixture is configured to releasably engage an opening of the rim, the fixture including: a main body portion configured to engage the opening of the rim of the vehicle tire; a pin slidably received within an opening of the main body portion; a flange portion secured to one end of the pin and a collar portion secured to the pin and located away from the flange portion, the flange portion is located at one side of the opening of the main body portion and the collar portion is located at an opposite side of the opening of the main body portion so that the pin can slide within the opening of the main body portion but not pass completely therethrough; a spring located between the flange portion and the main body portion, the spring being larger than the opening of the main body portion, the spring providing a biasing force between the pin and the main body portion; a cable fastener releasably secured to the pin by another pin that slidably engages an opening in the cable fastener and an opening in the pin such that the cable fastener can be releasably secured to the pin, the cable fastener being secured to the first cable and the second cable; and a pair of spring tabs secured to the main body portion, the spring tabs are capable of being deflected from the main body portion towards each other so that they can pass through the opening of the rim of the vehicle tire and then after a force biasing the spring tabs toward each other is removed after they are passed through the opening of the rim of the vehicle tire they will return to their an unbiased position and retain the main body portion to the rim of the vehicle tire.

BRIEF DESCRIPTION OF THE DRAWINGS

The following descriptions should not be considered limiting in any way. With reference to the accompanying drawings, like elements are numbered alike:

FIGS. 7A and 7B illustrate a mechanism for releasably engaging a rim of a vehicle tire;

DETAILED DESCRIPTION

A detailed description of one or more embodiments of the disclosed apparatus and method are presented herein by way of exemplification and not limitation with reference to the Figures.

Figure 1A:
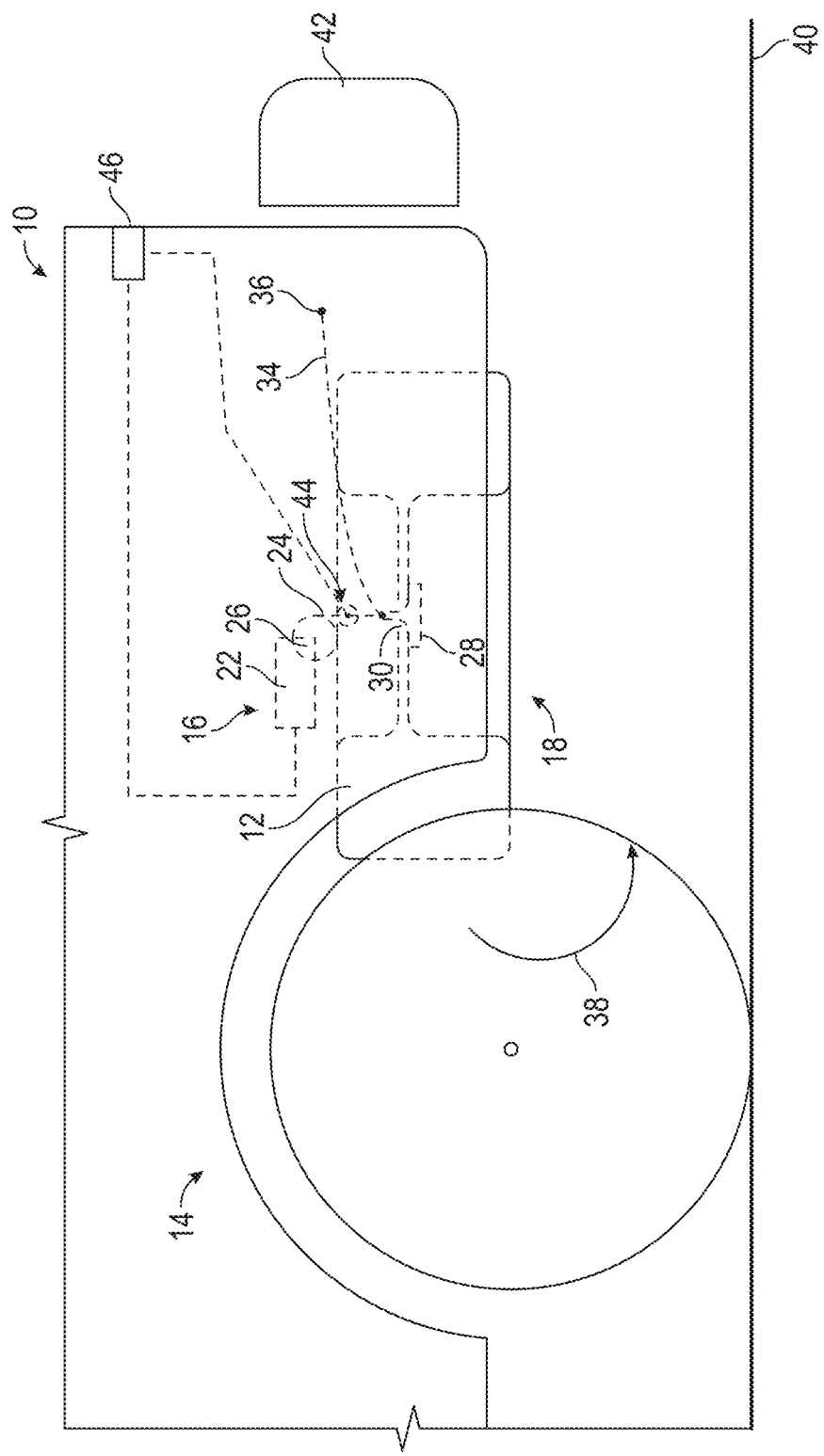
FIGS. 1A and 1B illustrate an apparatus and method for stowing and deploying a vehicle tire in accordance with a first embodiment of the present disclosure.
Figure 1B:
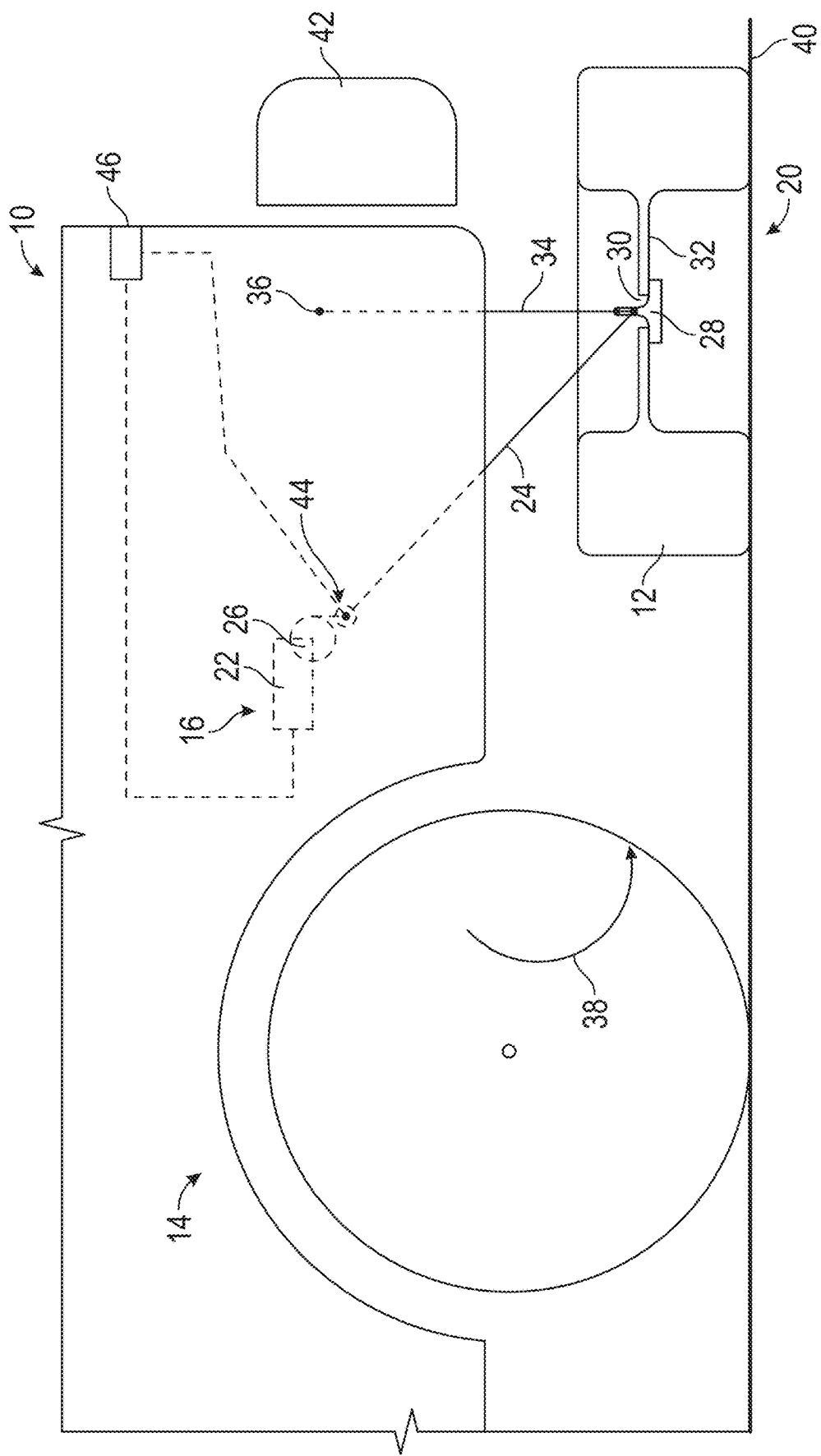

FIGS. 1A and 1B illustrate an apparatus 10 and method for stowing and deploying a vehicle tire 12 from a rear portion 14 of a vehicle in accordance with a first embodiment of the present disclosure. In this embodiment, a raising and lowering mechanism 16 is provided to move the tire 12 from a stowed position 18 to a deployed position 20. During this movement from the stowed position to the deployed position the tire is lowered and moved laterally so that the tire is easily accessible from an undercarriage or portion of the vehicle. In one embodiment, the raising and lowering mechanism 16 includes a motor 22 for winding and unwinding a cable 24 from a drum 26. The unwinding of the cable 24 from the drum 26 in a first direction causes deployment of the vehicle tire 12 from the stowed position to deployed position and the winding of the cable 24 onto the drum 26 in a second direction opposite to the first direction causes the vehicle tire 12 to move from the deployed position to the stowed position. The cable 24 is secured to a fixture 28 at one end and the drum 26 at the other end. The fixture 28 is large enough to prevent it from passing through an opening 30 in a rim 32 of the tire 12 when there is tension on cable 24 and fixture 28 is small enough to allow it to be manipulated and pass through opening 30 in the rim 32 of the tire 12 when there is slack in the cable 24. The raising and lowering mechanism 16 also includes a swing cable 34. The swing cable 34 is secured to the fixture 28 at one end and another portion 36 of the vehicle at another end. The swing cable 34 has a fixed length such that as the raising and lowering mechanism 16 lowers the tire from the stowed position 18 (FIG. 1A) to the deployed position 20 (FIG. 1B) the tire 12 swings in the direction of arrow 38 until it rests upon surface 40. As illustrated and when the tire 12 is in the deployed position 20, the tire 12 is accessible from the rear bumper 42 of the rear portion of the vehicle 14.

In order to raise the tire 12 from the deployed position 20 to the stowed position 18, the motor 22 of the raising and lowering mechanism 16 winds cable 24 about drum 26 and the tire moves in a direction opposite to arrow 38. Once the tire is in the stowed position 18 a latch 44 comprising a fork bolt and detent or other equivalent device is configured to engage a latch or striker so that the tire 12 remains in the stowed position 18. In one embodiment, the latch or striker may be a portion of feature 28. Operation of the raising and lowering mechanism 16 as well as the detent to release the fork bolt from the latch or striker may be operated by a switch 46 located in an accessible portion of the vehicle. In one embodiment, the switch 46 is operably coupled to the motor 26 and as well as the latch 44 in order operate the same. Alternatively, an equivalent latching mechanism or retaining means of mechanism may be used to retain the tire 12 in the stowed position illustrated in FIG. 1A.

Figure 2A:
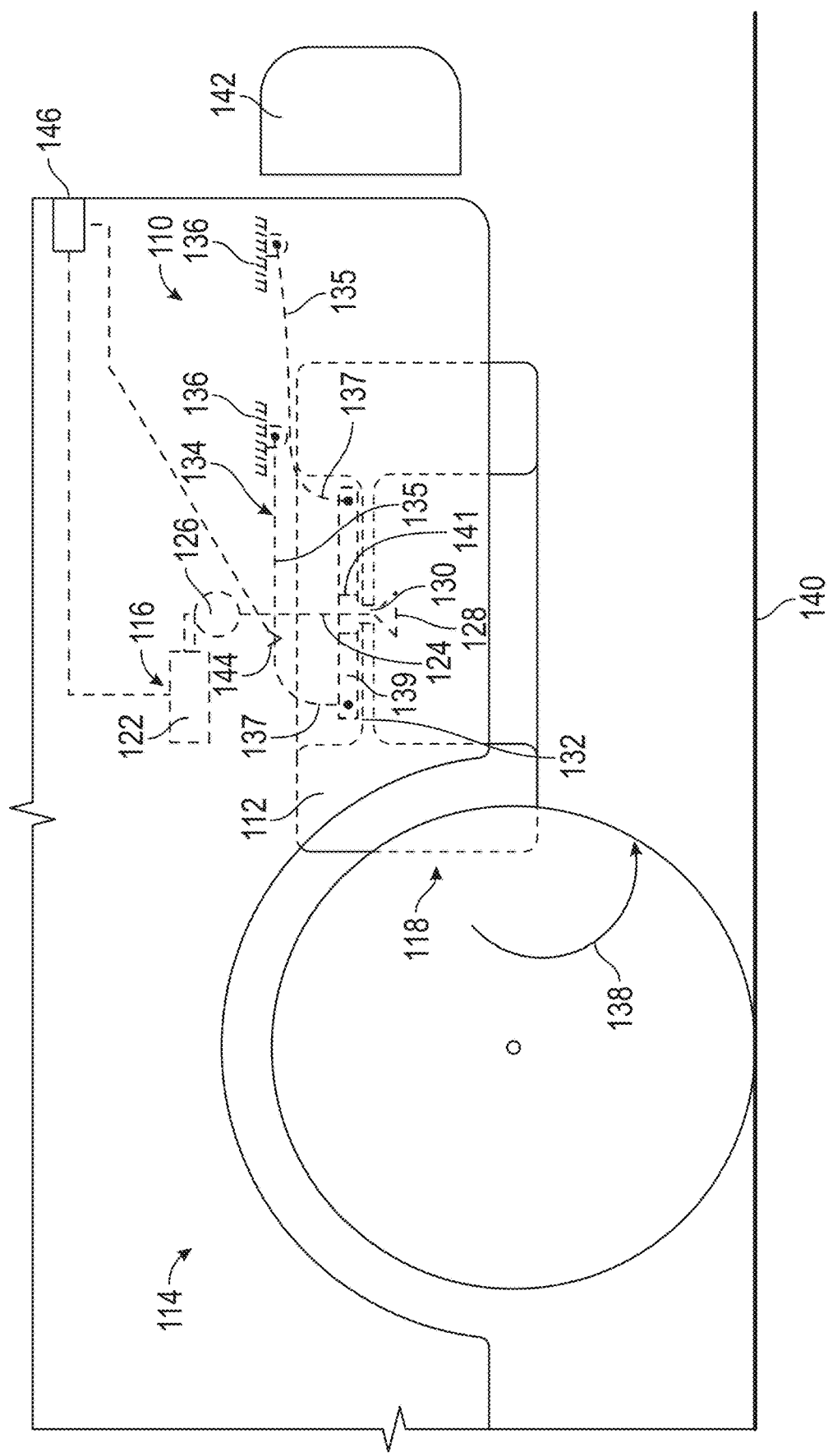
FIGS. 2A and 2B illustrate an apparatus and method for stowing and deploying a vehicle tire in accordance with a second embodiment of the present disclosure.
Figure 2B:
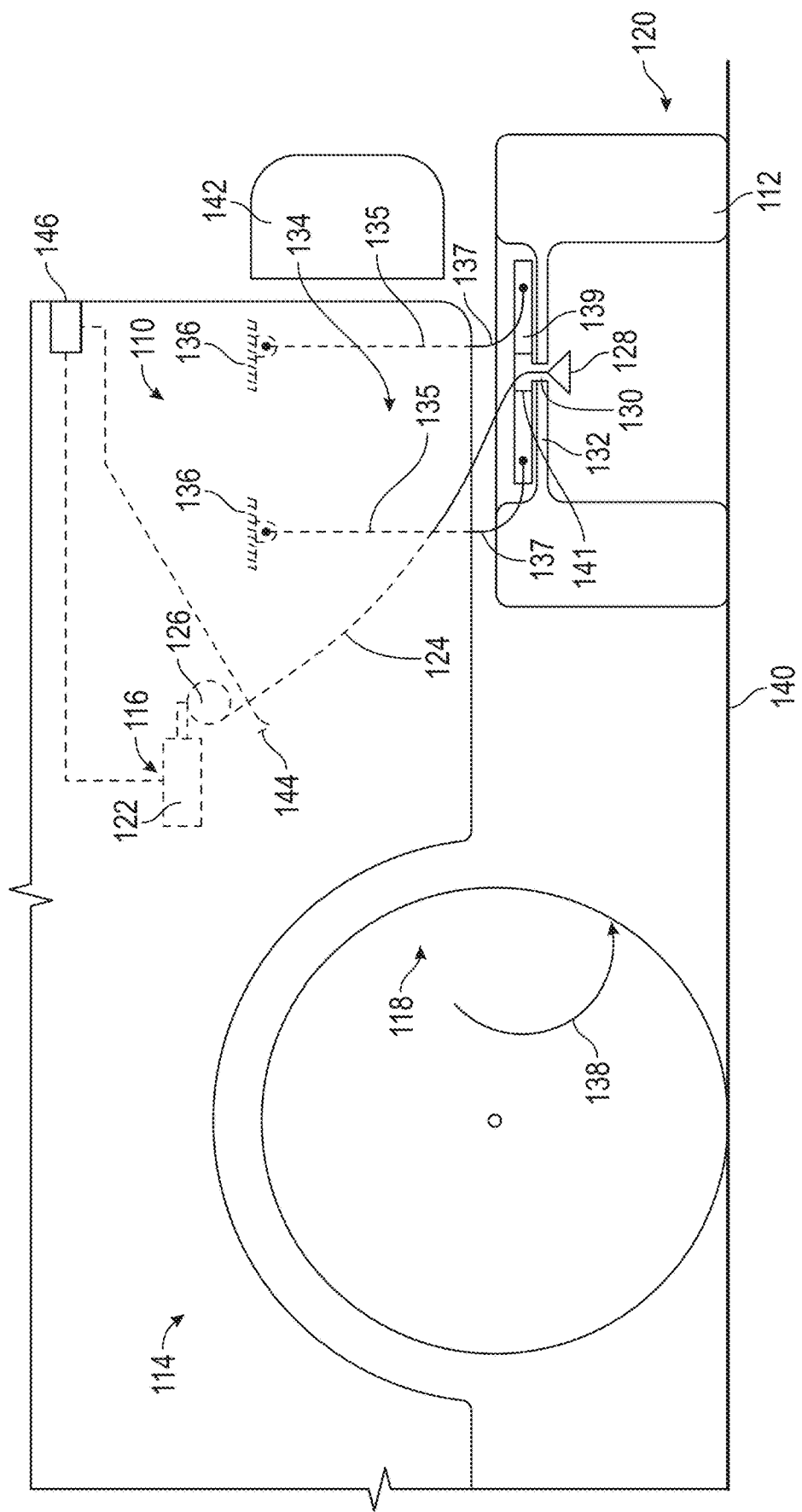

FIGS. 2A and 2B illustrate an apparatus 110 and method for stowing and deploying a vehicle tire 112 from a rear portion 114 of a vehicle in accordance with a second embodiment of the present disclosure. In this embodiment, a raising and lowering mechanism 116 is provided to move the tire 112 from a stowed position 118 (FIG. 2A) to a deployed position 120 (FIG. 2B). During this movement from the stowed position to the deployed position the tire is lowered and moved laterally so that the tire is easily accessible from an undercarriage or portion of the vehicle. In one embodiment, the raising and lowering mechanism 116 includes a motor 122 for winding and unwinding a cable 124 from a drum 126. The unwinding of the cable 124 from the drum 126 in a first direction causes deployment of the vehicle tire 112 from the stowed position to deployed position and the winding of the cable 124 onto the drum 126 in a second direction opposite to the first direction causes the vehicle tire 112 to move from the deployed position to the stowed position. The cable 124 is secured to a fixture 128 at one end and the drum 126 at the other end. The fixture 128 is large enough to prevent it from passing through an opening 130 in a rim 132 of the tire 112 when there is tension on cable 124 and fixture 128 is small enough to allow it to be manipulated and pass through opening 130 in the rim 132 of the tire 112 when there is slack in the cable 124. The raising and lowering mechanism 116 also includes a four bar swing 134. The four bar swing 134 includes a plurality of arms 135 with curved ends 137, the curved ends 137 are pivotally secured to a cross bar 139 that is releasably secured to the tire 112 and/or the cable 124 and opposite ends of the plurality of arms 135 are pivotally secured to another portion 136 of the vehicle at another end. In one non-limiting embodiment, the cross bar 139 may have an opening 141 substantially aligned with opening 130 in the rim 132 of the tire 112. Similar to the tire, the fixture 128 is large enough to prevent it from passing through opening 141 in the cross bar 139 when there is tension on cable 124 and fixture 128 is small enough to allow it to be manipulated and pass through opening 141 in the cross bar 139 when there is slack in the cable 124. Alternatively, the cross bar 139 may be releasably secured to the tire 112 in some other fashion. The arms 135 have a fixed length such that as the raising and lowering mechanism 116 lowers the tire 112 from the stowed position 118 to the deployed position 120 the tire 112 swings in the direction of arrow 138 until it rests upon surface 140.

As illustrated and when the tire 112 is in the deployed position 120, the tire 112 is accessible from the rear bumper 142 of the rear portion of the vehicle 114.

In order to raise the tire 112 from the deployed position 120 to the stowed position 118, the motor 122 of the raising and lowering mechanism 116 winds cable 124 about drum 126 and the tire 112 moves in a direction opposite to arrow 138. Once the tire 112 is in the stowed position 118 a latch 144 comprising a fork bolt and detent is configured to engage a latch or striker so that the tire 112 remains in the stowed position 118. In one embodiment, the latch or striker may be a portion of the arm 135 or feature 128. Operation of the raising and lowering mechanism 116 as well as the detent to release the fork bolt from the latch or striker may be operated by a switch 146 located in an accessible portion of the vehicle. In one embodiment, the switch 146 is operably coupled to the motor 126 and as well as the latch 144 in order operate the same. Alternatively, an equivalent latching mechanism or retaining means of mechanism may be used to retain the tire 112 in the stowed position illustrated in FIG. 2A.

Figure 3A:
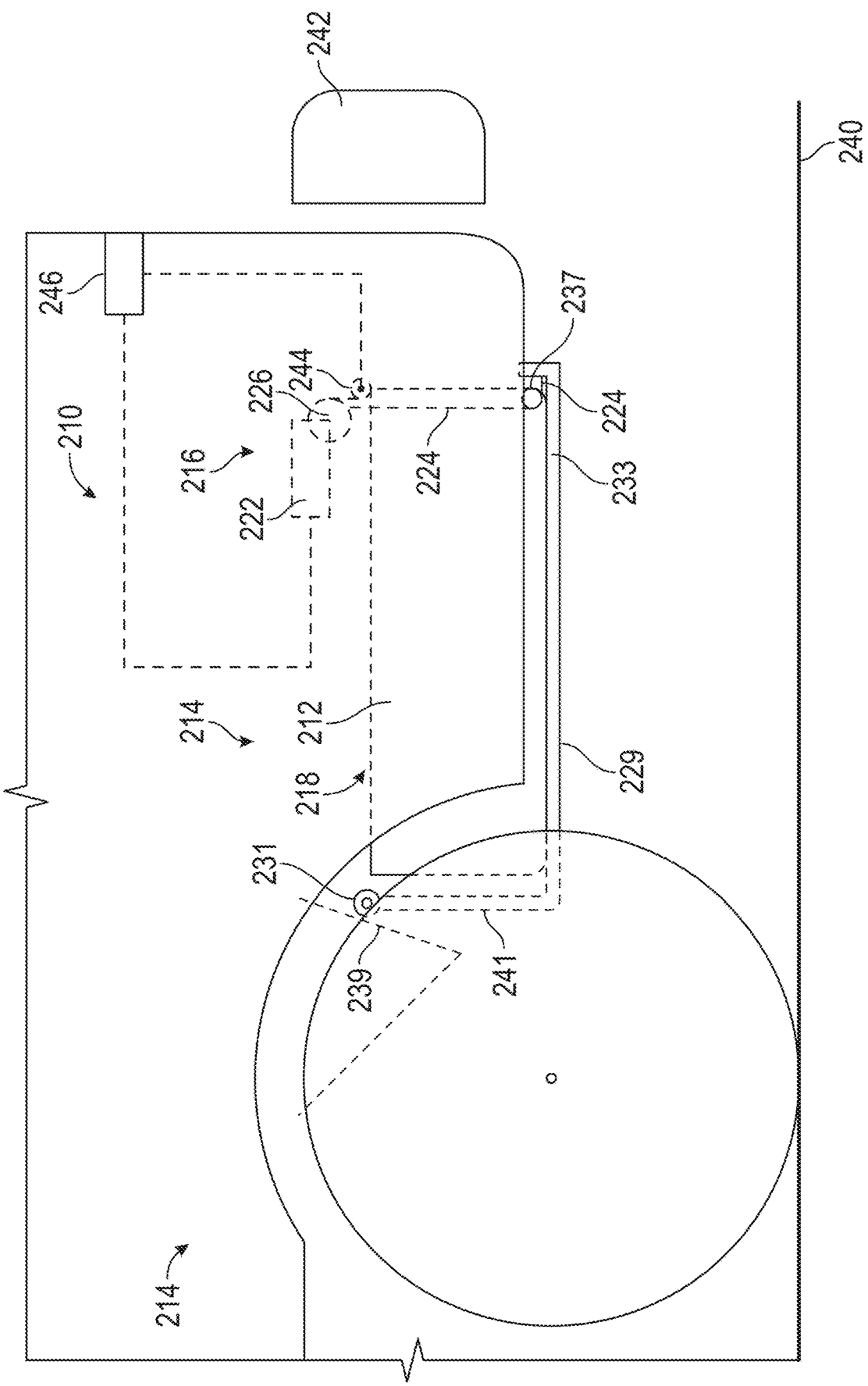
FIGS. 3A-3C illustrate an apparatus and method for stowing and deploying a vehicle tire in accordance with a third embodiment of the present disclosure.
Figure 3B:
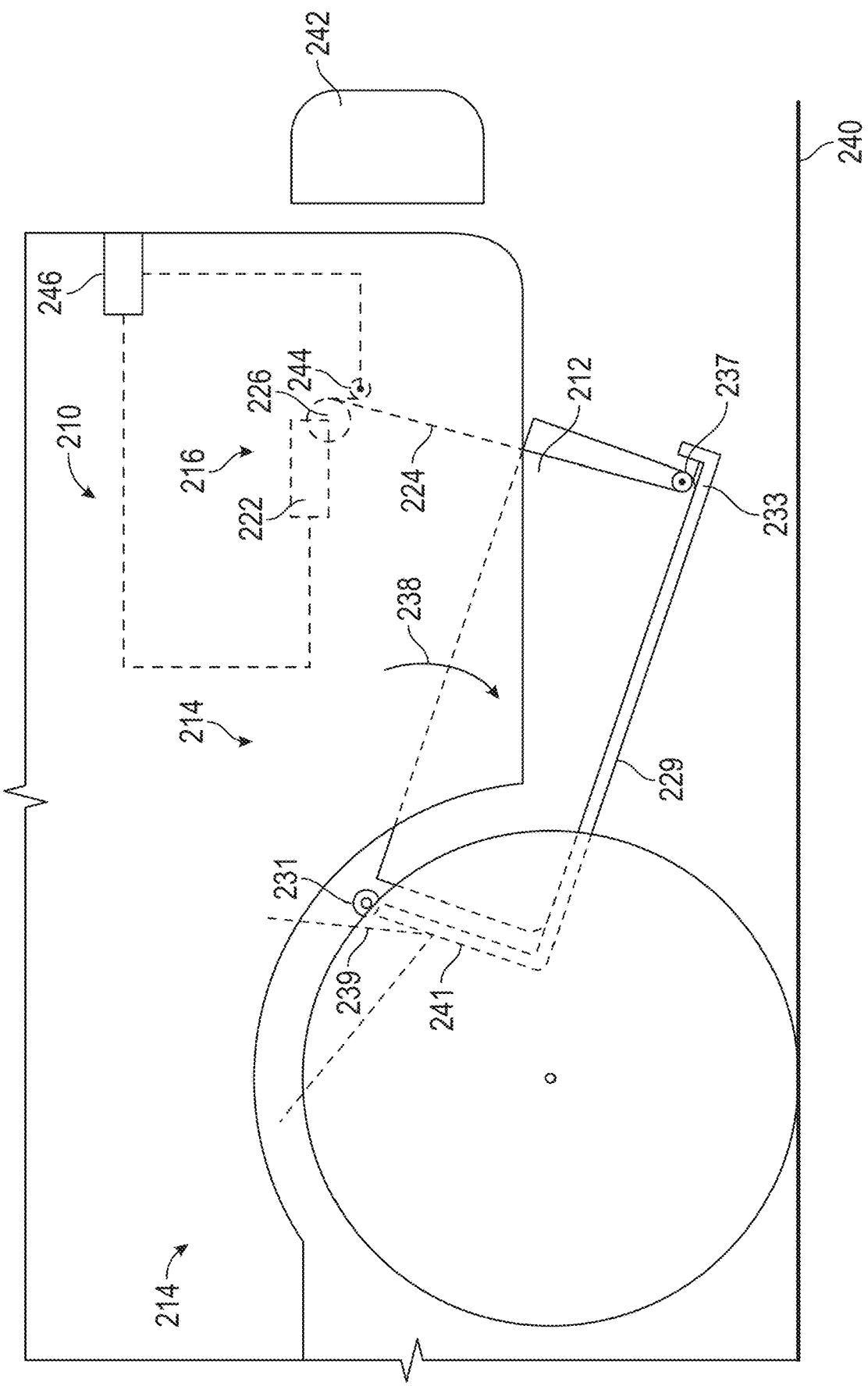
Figure 3C:
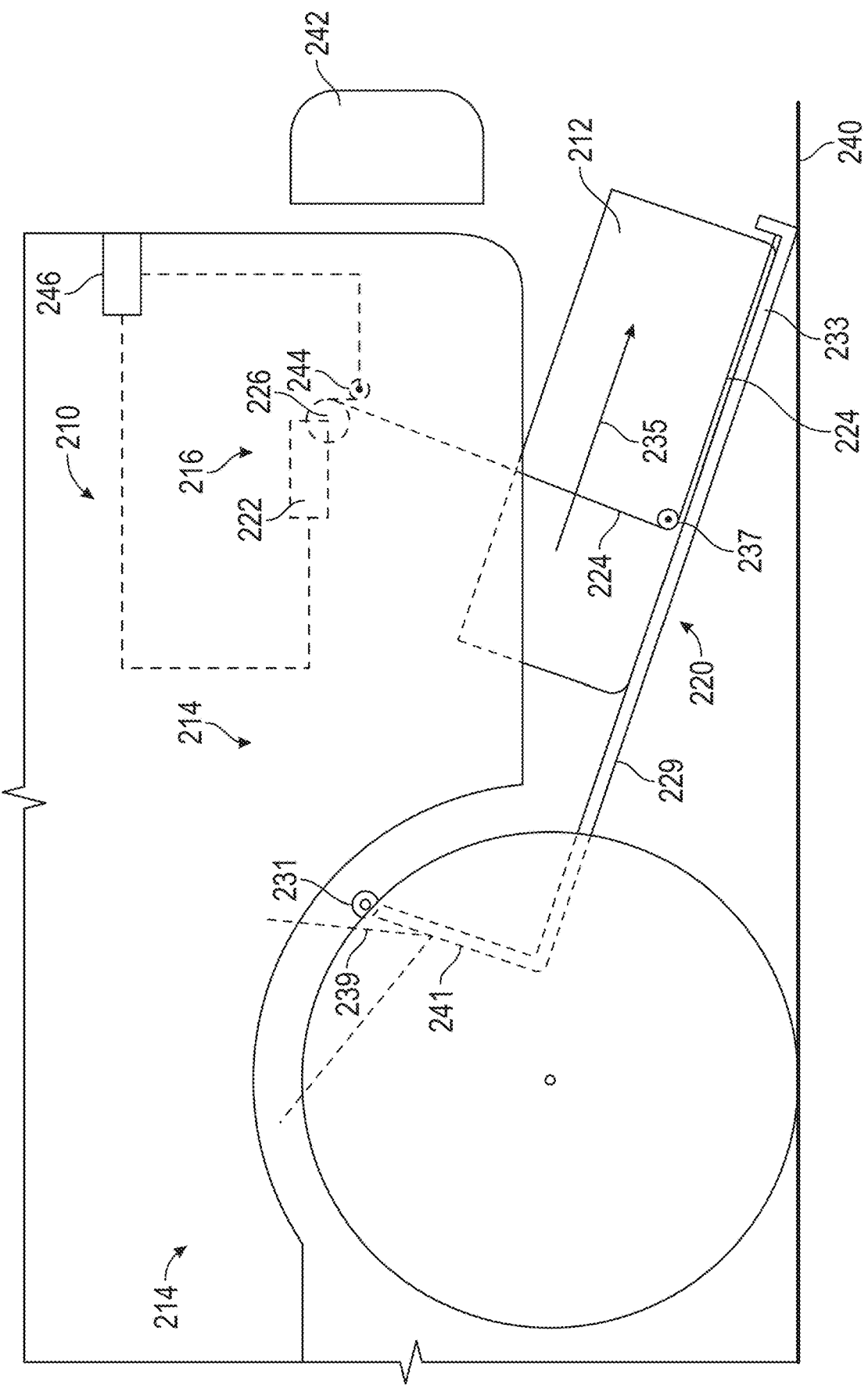

FIGS. 3A-3C illustrate an apparatus 210 and method for stowing and deploying a vehicle tire 212 from a rear portion 214 of a vehicle in accordance with a third embodiment of the present disclosure. In this embodiment, a raising and lowering mechanism 216 is provided to move the tire 212 from a stowed position 218 (FIG. 3A) in the direction arrow 238 to a deployed position 220 (FIG. 3C). During this movement from the stowed position to the deployed position the tire is lowered and moved laterally so that the tire is easily accessible from an undercarriage or portion of the vehicle. In one embodiment, the raising and lowering mechanism 216 includes a motor 222 for winding and unwinding a cable 224 from a drum 226. The tire tray 229 is pivotally mounted to the vehicle at a mounting point 231. The tire tray 229 includes a lower tray portion or tray portion 233 that is slidably mounted to the tire tray 229 such that the lower tray portion 233 can slide in the direction of arrow 235 until the lower tray portion 233 is in the deployed position 220. In one non-limiting embodiment, the tire 212 is releasably secured to the lower tray portion 233 by any suitable releasable attachment mechanism. The unwinding of the cable 224 from the drum 226 in a first direction causes deployment of the vehicle tire 212 from the stowed position to deployed position and the winding of the cable 224 onto the drum 226 in a second direction opposite to the first direction causes the vehicle tire 212 to move from the deployed position to the stowed position. The cable 224 is secured to lower tire tray portion 233 at one end and the drum 226 at the other end.

In order to deploy the tire tray 229 and slide the lower tire tray portion 233 in the direction of arrow 235 as well as a direction opposite to arrow 235, a pulley or guide member 237 is mounted to tray 229 and cable 224 is received on pulley or guide member 237. In addition, the apparatus 210 also includes a stop member 239 that defines a maximum point of rotation or pivotal movement of the tray 229 in the direction of arrow 238. For example, a wall portion 241 of tray 229 contacts stop member 239 when the tray is lowered into the position illustrated in FIG. 3B. Thereafter, further unwinding of cable 224 from drum 226 will cause lower tray portion 233 to slide in the direction of arrow 235 until it contacts surface 240.

In other words, the tray 229 is in the deployed position 220, the lower tire tray portion continues to slide in the direction of arrow 235 until it rests upon surface 240 (FIG. 3C). As illustrated and when the tire 212 is in the position illustrated in FIG. 3C, the tire 212 is accessible from the rear bumper 242 of the rear portion of the vehicle 214.

In order to raise the tire 212 from the position illustrated in FIG. 3C to the stowed position 218 (FIG. 3A), the motor 222 of the raising and lowering mechanism 216 winds cable 224 about drum 226 and the tire moves in direction opposite to arrow 238. Prior to this operation the lower tray portion 233 is slid in a direction opposite to arrow 235 so that the lower tray portion 233 is in the position corresponding to the deployed position illustrated in FIG. 3B. Thereafter, the raising and lowering mechanism 216 winds cable 224 about drum 226 and the tire moves in direction opposite to arrow 238 so that the tire 212 can be located in the stowed position 218 illustrated in FIG. 3A. Once the tire is in the stowed position 218, a latch 244 comprising a fork bolt and detent is configured to engage a latch or striker so that the tire 212 remains in the stowed position 218. In one embodiment, the latch or striker may be a portion of the tire tray 229. Operation of the raising and lowering mechanism 216 as well as the detent to release the fork bolt from the latch or striker may be operated by a switch 246 located in an accessible portion of the vehicle. In one embodiment, the switch 246 is operably coupled to the motor 226 and as well as the latch 244 in order operate the same. Alternatively, an equivalent latching mechanism or retaining means of mechanism may be used to retain the tire 212 in the stowed position illustrated in FIG. 3A.

Figure 4A:
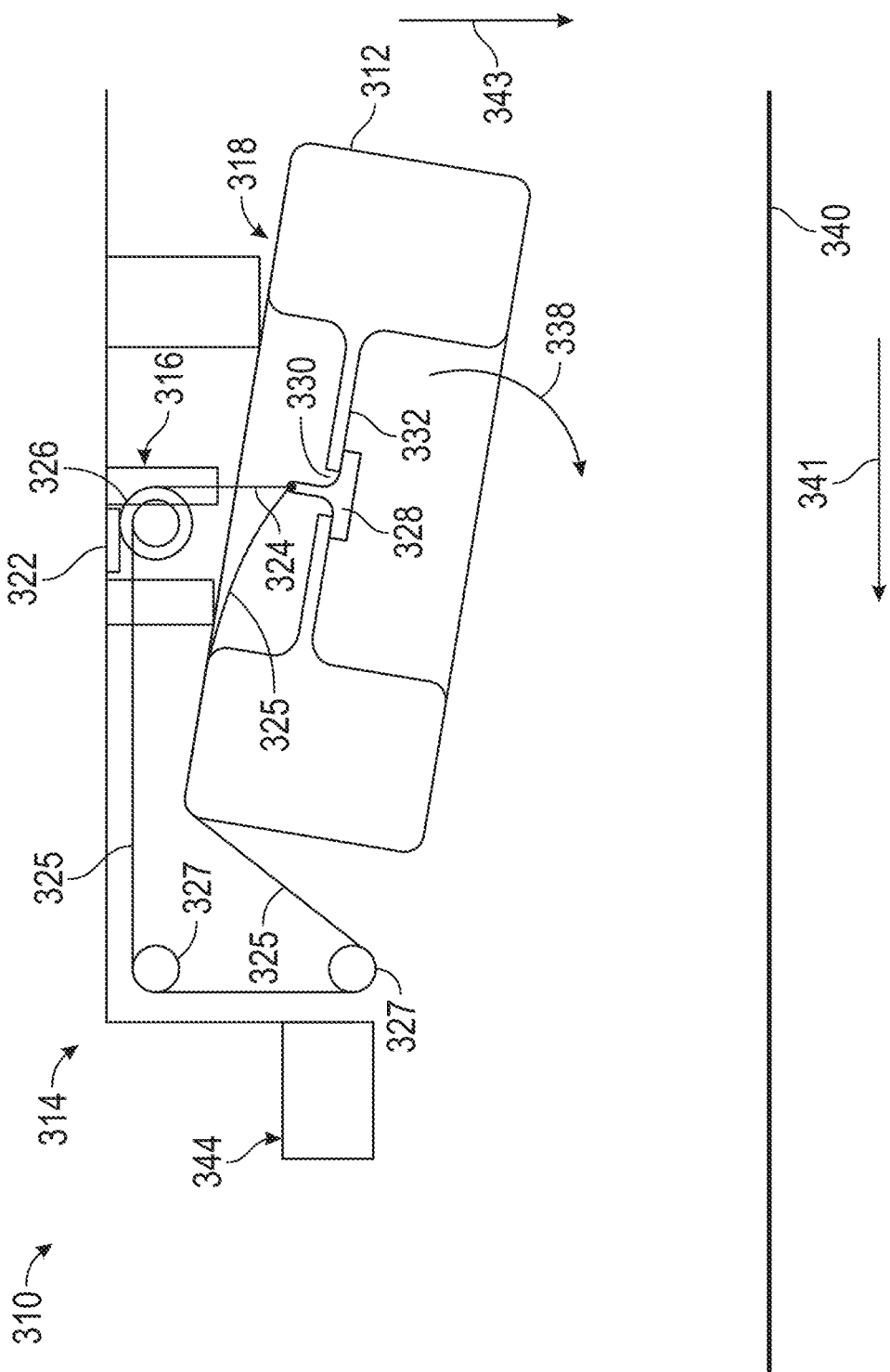
FIGS. 4A and 4B illustrates an apparatus and method for stowing and deploying a vehicle tire in accordance with a fourth embodiment of the present disclosure.
Figure 4B:
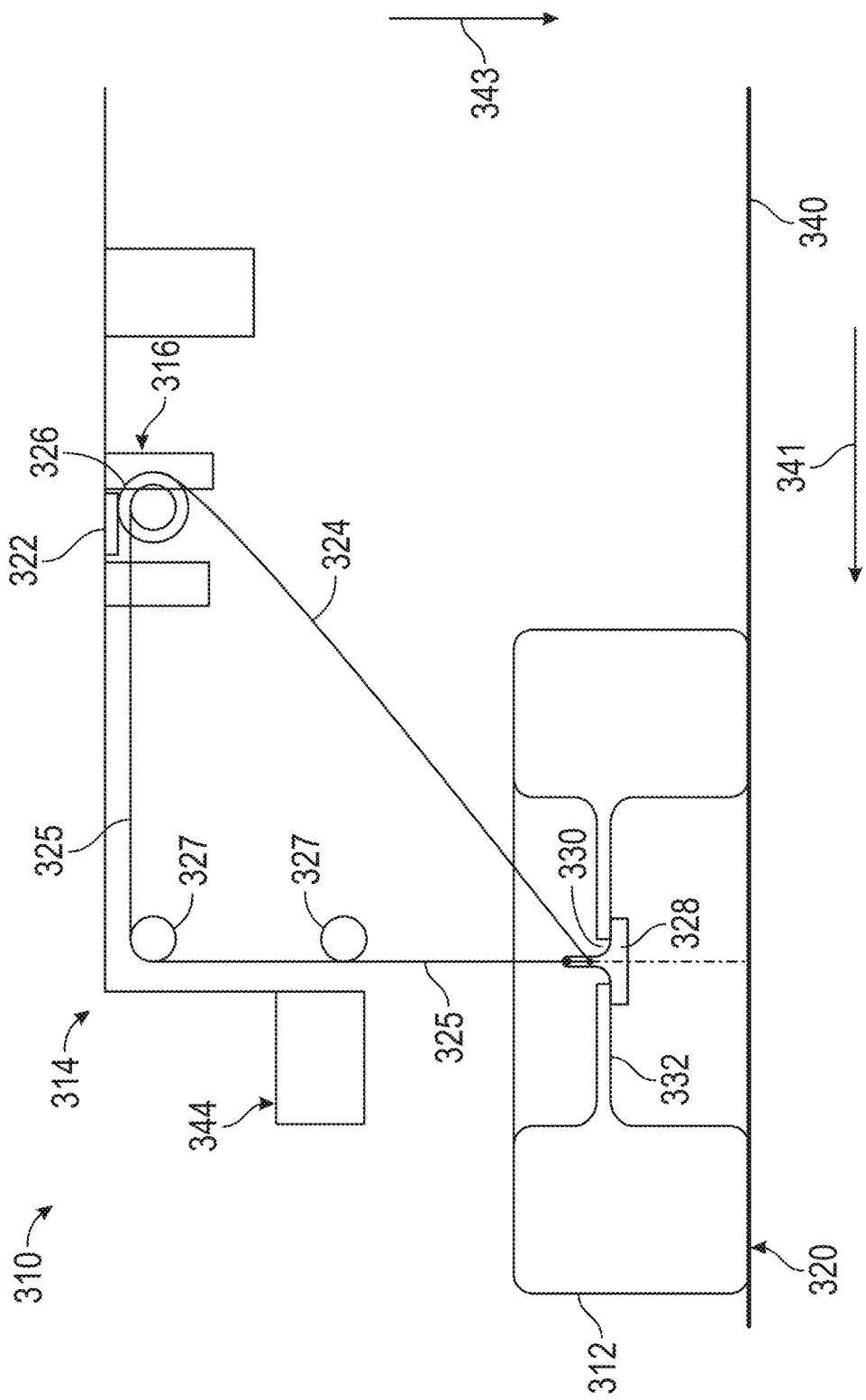

FIGS. 4A and 4B illustrate an apparatus 310 and method for stowing and deploying a vehicle tire 312 from a rear portion 314 of a vehicle in accordance with a fourth embodiment of the present disclosure. In this embodiment, a raising and lowering mechanism 316 is provided to move the tire 312 from a stowed position 318 (FIG. 4A) in the direction arrow 338 toward a deployed position 320 (FIG. 4B). During this movement from the stowed position 318 to the deployed position 320 the tire 312 is lowered toward the ground 340 the vehicle located on. In order to move the tire 312 into the deployed position 320, the tire 312 is moved laterally in the direction of arrow 341 to the deployed position 320. During this movement (e.g., in the direction of arrow 340) the tire 312 is moved laterally so that the tire 312 is easily accessible from an undercarriage or bumper portion 344 of the vehicle.

In one embodiment, movement of the tire 312 in the direction of arrow 341 to the deployed position 320 occurs as the tire 312 is moved downwardly in the direction of arrow 343.

In one embodiment, the raising and lowering mechanism 316 includes a motor 322 for winding and unwinding a first cable or lowering and raising cable 324 and winding and unwinding a second cable or presenting cable 325 from a dual diameter cable drum 326. The motor 322 is operatively coupled to the dual diameter cable drum 326. The first cable or lowering and raising cable 324 is secured to the tire 312 at one end and the dual diameter cable drum 326 at the other end. In addition, the second cable or presenting cable 325 is secured to the tire 312 at one end and the dual diameter cable drum 226 at the other end. In addition, a pulley or pulleys or guide member or guide members 327 are provided in order to cause the tire 312 to translate in the direction of arrow 341 when the tire is deployed or in a direction opposite to the direction of arrow 341 when the tire 312 is stowed.

As the tire 312 is deployed, the dual diameter cable drum 226 unwinds the first cable 324 while the second cable 325 is wound upon the dual diameter cable drum 326. This winding of the second cable 325 guides the tire 312 in the direction of arrows 338 and 341. As the tire 312 is returned from the deployed position 320 to the stowed position 318, the first cable 324 is wound upon the dual diameter cable drum 326 and the second cable is unwound from the dual diameter cable drum 326. In other words, the dual diameter cable drum 326 has two different diameter profiles (e.g., one larger than the other) wherein the first cable 324 is on one of the cable drum profiles while the second cable 325 is one the other one of the cable drum profile thus, the cables 324 and 325 are wound and unwound at different rates since they are of different lengths to allow for the deployment and storage of the tire 312. The dual diameter cable drum 326 is required since the second cable length will be different than the first cable length.

In one non-limiting embodiment, the first cable 324 and the second cable 325 are secured to a fixture 328 at one end and the dual diameter cable drum 326 at the other end. The fixture 328 is large enough to prevent it from passing through an opening 330 in a rim 332 of the tire 312 when there is tension on the first cable 324 and the second cable 325 and fixture 328 is small enough to allow it to be manipulated and pass through opening 330 in the rim 332 of the tire 312 when there is slack in the first cable 324 and the second cable 325.

As in the previous embodiments, a latching mechanism may be provided in order to retain the tire 312 in the stowed position 318. The latching mechanism may comprise as a fork bolt or claw and a detent or pawl that are configured to engage a latch or striker so that the tire 312 remains in the stowed position 318. Alternatively, the raising and lowering mechanism 316 may be configured without the latching mechanism and the tire 312 is retained in the stowed position 318 by retaining the cables 324, 325 in a wound position by either locking or preventing rotation of the dual cable drum 326.

Operation of the raising and lowering mechanism 316 as well as the detent to release the fork bolt from the latch or striker may be operated by a switch located in an accessible portion of the vehicle. In one embodiment, the switch is operably coupled to the motor 322 and as well as the latch in order operate the same.

Alternatively, the raising and lowering mechanism 316 may be operated manually via a handle or crank as opposed to motor 322. For example and in this embodiment, the dual cable drum 326 is rotated manually via the handle or crank operatively coupled to the dual cable drum 326.

Figure 5:
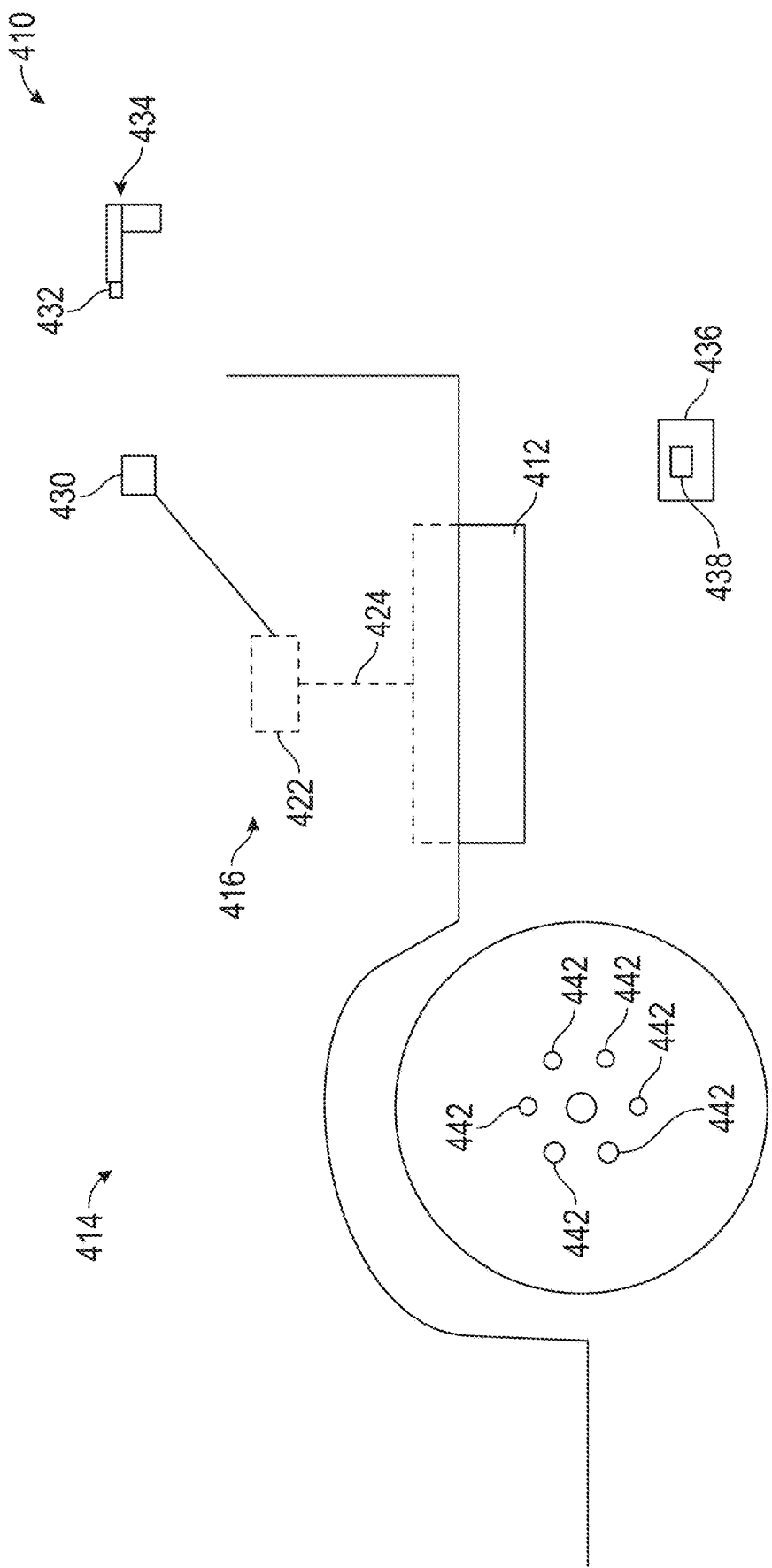
FIG. 5 schematically illustrates an apparatus and method for stowing and deploying a vehicle tire in accordance with various embodiments of the present disclosure.

FIG. 5 illustrates an apparatus 410 and method for stowing and deploying a vehicle tire or spare tire 412 from a rear portion 414 of a vehicle in accordance with another non-limiting embodiment of the present disclosure. In this embodiment, a raising and lowering mechanism 416 is provided to move the vehicle tire or spare tire 412 from a stowed position to a deployed position. During this movement from the stowed position to the deployed position the vehicle tire is lowered so that the vehicle tire is easily accessible from an undercarriage or portion of the vehicle. In one embodiment, the raising and lowering mechanism 416 includes a mechanism 422 for winding and unwinding a cable 424 from a drum. The unwinding of the cable 424 from the drum in a first direction causes deployment of the vehicle tire or spare tire 412 from the stowed position to deployed position and the winding of the cable 424 onto the drum in a second direction opposite to the first direction causes the vehicle tire or spare tire 412 to move from the deployed position to the stowed position.

In accordance with one non-limiting embodiment of the present disclosure, the raising and lowering mechanism 416 is provided with a feature 430 that is operably coupled to the mechanism 422 such that rotation of the feature 430 causes the cable 424 to be wound and unwound so that the vehicle tire or spare tire 412 can be stowed and deployed. Although, the feature 430 is shown spaced from the mechanism 422 in FIG. 5 it is or course understood the feature 430 may be integral with mechanism 422. In one embodiment, the feature 430 is engageable by an adapter 432. Adapter 432 is configured to be received and rotationally driven by a hand held power driver 434. For example, feature 430 and adapter 432 may be a nut and socket or socket and complimentary driver arrangement or any other equivalent means for transferring rotational movement from the hand held power driver 434 to the raising and lowering mechanism 416 so that the vehicle tire 412 or spare tire can be deployed and stowed using the hand held power driver 434.

In one non-limiting embodiment, the hand held power driver 434 is similar to a cordless drill or battery powered drill such that a rotatable chuck of the hand held power driver 434 can support and rotate the adapter 432. In one embodiment, adapter 432 may be removably secured to a chuck of the hand held power driver 434.

Also shown schematically is a vehicle jack 436. The vehicle jack 436 also has a feature 438, which when rotated will cause the vehicle jack 436 to be raised and lowered such that the vehicle can be raised and lowered so that another vehicle tire 440 can be replaced with vehicle tire or spare tire 412. In one non-limiting embodiment, feature 438 is configured to be engaged by adapter 432 such that the vehicle jack 436 can be raised and lowered with the hand held power driver 434.

Still further and in yet another embodiment, the adapter 432 may also be configured to engage lug nuts 442 of the vehicle tire 440 thus, the hand held power driver 434 may also be configured to engage the lug nuts 442 of the vehicle tire 440.

As such and in one non-limiting embodiment, a set of adapters 432 one for each of the features 430, 438 and lug nuts 442 or a single universal adapter 432 is provided to engage and drive the features 430, 438 and lug nuts 442 (e.g., features 430, 438 and lug nuts 442 are all the same size). Thus, hand held power driver 434 may be used to raise and lower the vehicle tire or spare tire 412, raise and lower the vehicle with the jack 438 and remove and replace the lug nuts 442. Accordingly, the hand held power driver 434 can be used to perform tasks that were typically performed by manual operation.

In one non-limiting embodiment, the hand held power driver 434 can be stored in the vehicle such that its battery is being charged by the vehicle power.

Figure 6:
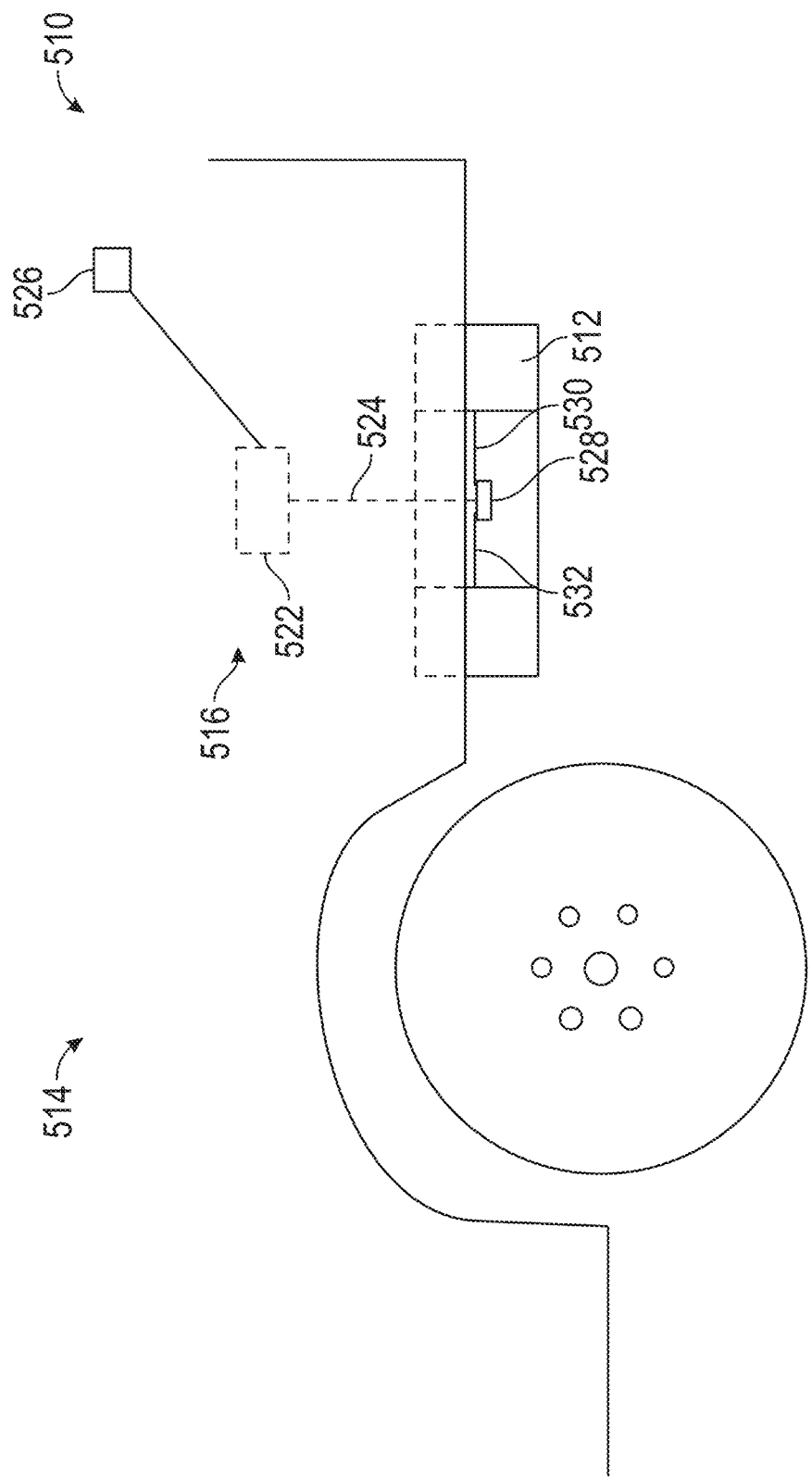
FIG. 6 schematically illustrates an apparatus and method for stowing and deploying a vehicle tire in accordance with various embodiments of the present disclosure.

FIG. 6 illustrates an apparatus 510 and method for stowing and deploying a vehicle tire or spare tire 512 from a rear portion 514 of a vehicle in accordance with another non-limiting embodiment of the present disclosure. In this embodiment, a raising and lowering mechanism 516 is provided to move the vehicle tire or spare tire 512 from a stowed position to a deployed position. During this movement from the stowed position to the deployed position the vehicle tire is lowered so that the vehicle tire is easily accessible from an undercarriage or portion of the vehicle. In one embodiment, the raising and lowering mechanism 516 includes a mechanism 522 for winding and unwinding a cable 524 from a drum. The unwinding of the cable 524 from the drum in a first direction causes deployment of the vehicle tire or spare tire 512 from the stowed position to deployed position and the winding of the cable 524 onto the drum in a second direction opposite to the first direction causes the vehicle tire or spare tire 512 to move from the deployed position to the stowed position.

In accordance with one non-limiting embodiment of the present disclosure, the raising and lowering mechanism 516 is provided with a feature 526 that is operably coupled to the mechanism 522 such that rotation of the feature 526 causes the cable 524 to be wound and unwound so that the vehicle tire or spare tire 512 can be stowed and deployed. Although, the feature 526 is shown spaced from the mechanism 522 in FIG. 6 it is or course understood the feature 526 may be integral with mechanism 522. In one embodiment, the feature 526 is engageable by a mechanical crank or an adapter configured to engage and rotate feature 526.

In one non-limiting embodiment, the cable 524 is secured to a fixture 528 at one end and the drum at the other end. The fixture 528 is configured to transition between a first configuration where the fixture engages opposite sides of the rim 532 of the vehicle tire 512 and a second configuration where the fixture can pass through an opening 530 in the rim 532 of the vehicle tire 512.

As such and when the fixture 528 is in the first configuration it engages portions of the rim 532 of the vehicle tire 512 when the vehicle tire 512 is to be stowed and when it is in the second configuration it is small enough to allow portions of it to pass through opening 530 in the rim 532 of the vehicle tire 512 when the tire is to be deployed and used as a spare tire. As such, the fixture 528 can releasably engage the rim 532 of the vehicle tire 512.

Various embodiments of the present disclosure provide a clamping plate that can be released from above the vehicle tire 512 with a simple lever or turning action. The mechanical action will allow the clamping plate to be lifted off of the vehicle tire 512 from above as such, no tire lifting and simultaneous plate or fixture manipulation is required.

The reverse of the process will allow the tire to be stored by simply fitting the mechanism over the opening 530 in the rim 532 and engaging the lever of turning action to clamp the tire to the raising and lowering mechanism 516 making spare tire access and flat tire and/or spare tire storage much easier.

Figure 7B:
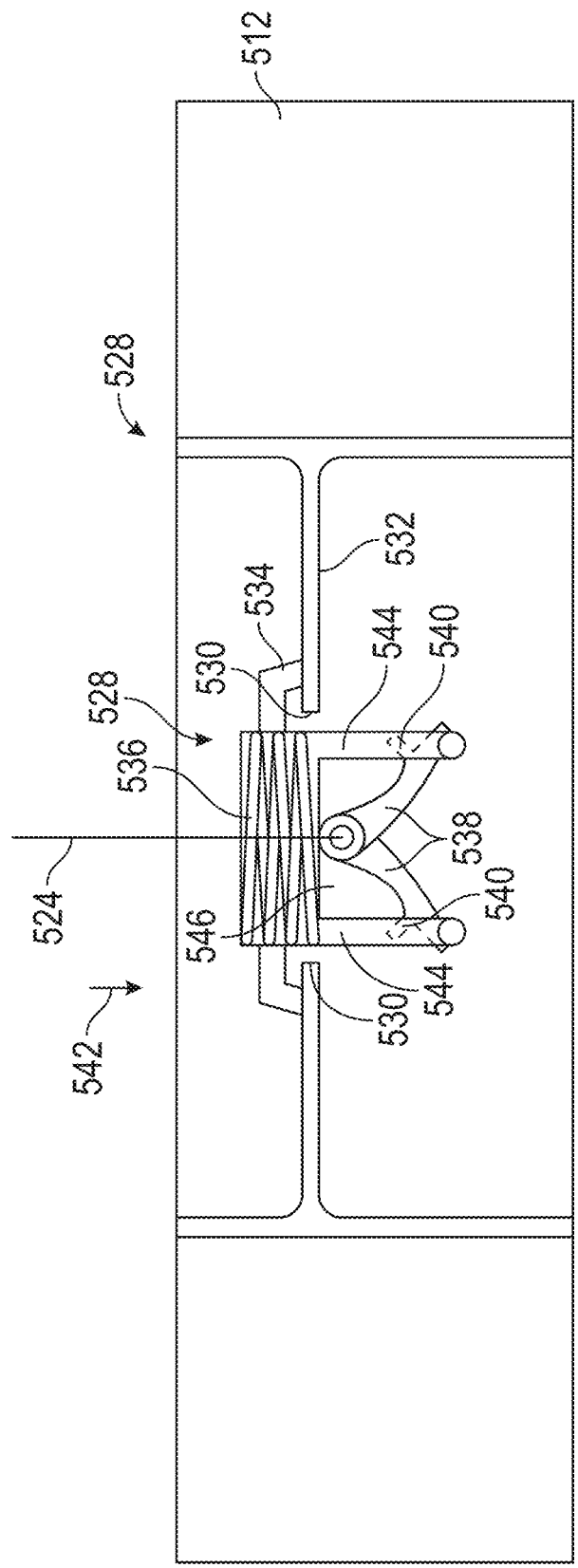

Referring now to FIGS. 7A and 7B one non-limiting fixture 528 is illustrated. In this embodiment, the fixture 528 includes a clamping plate 534, a nut 536 and a pair of pivoting arms 538. The pivoting arms 538 are pivotally secured to the cable 524. In addition, the pair of pivoting arms 538 may be movably attached to the nut 536. The nut threadingly engages a complimentary threaded opening of the clamping plate 534. The clamping plate 534 has a periphery that is larger than the opening 530 of the rim 532.

When the tire is to be stowed the pair of pivoting arms 538 engage the rim 532. In one non-limiting embodiment, the pair of pivoting arms 538 may have features 540 that engage the sides of the opening 530 when the fixture is in its clamping state corresponding to storage of the vehicle tire 512. When the tire is lowered to the ground, the clamping plate 534 is rotated and the nut 536 moves in the direction of arrow 542 until it is in the position illustrated in FIG. 7B. At this point and when the cable 524 is pulled in a direction opposite to arrow 542, the pair of pivoting arms 538 will pivot to the position illustrated in FIG. 7B such that they pass through opening 530 and the fixture 528 can be removed from the tire in the direction opposite to arrow 542.

In order to stow the vehicle tire 512 a reverse process is employed. The fixture 528 is placed over the opening 530 as depicted in FIG. 7B. Then the clamping plate 534 is rotated about nut 536 until it is in the position illustrated in FIG. 7A such that the pair of pivoting arms 538 now engage portions of the rim 532 proximate to the opening 530. Thereafter the cable 524 is wound about a drum and the vehicle tire 512 is raised and stowed in the vehicle. As illustrated, the nut 534 may have side walls 544 that define an interior space 546, which allows for the desired pivotal movement of the pair of pivoting arms 538.

Figure 8A:
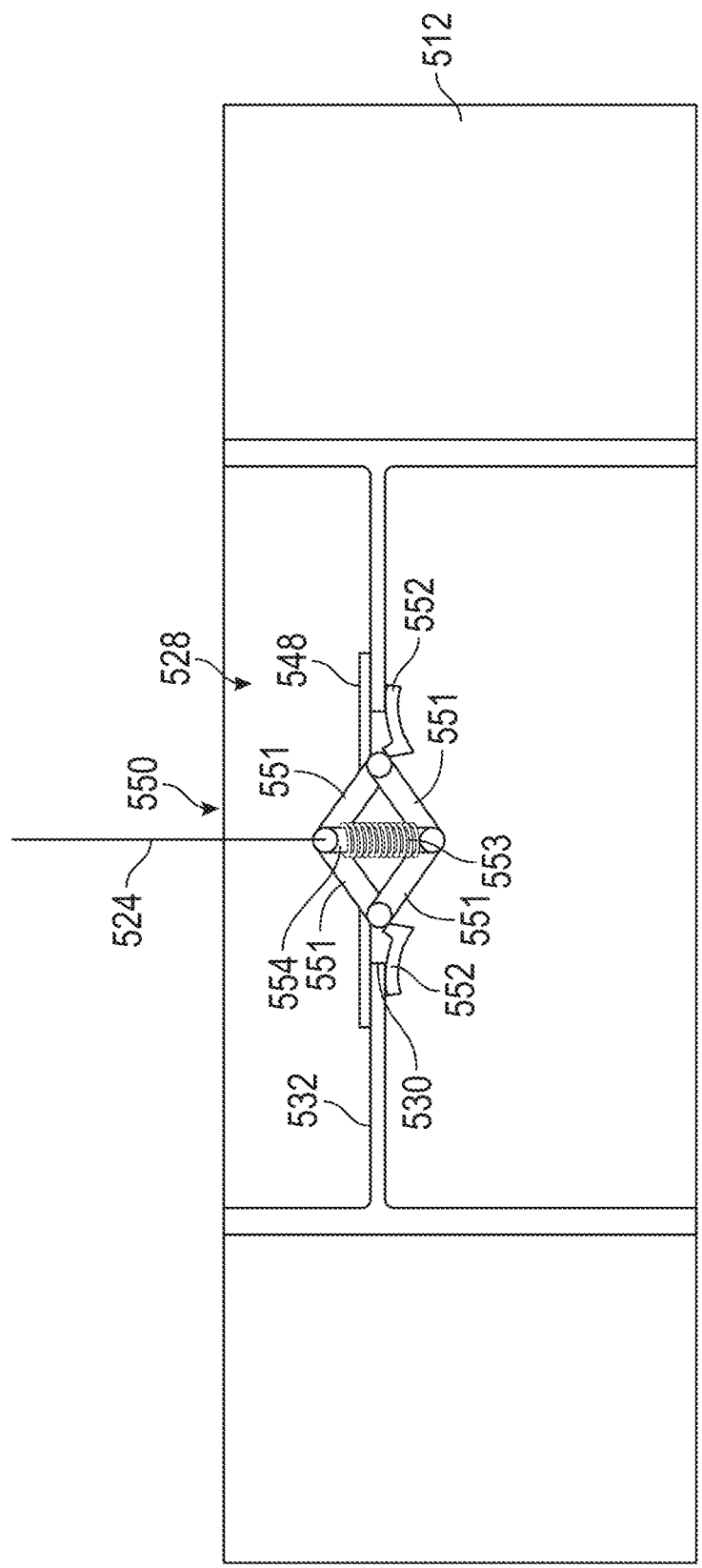
FIGS. 8A and 8B illustrate a mechanism for releasably engaging a rim of a vehicle tire.
Figure 8B:
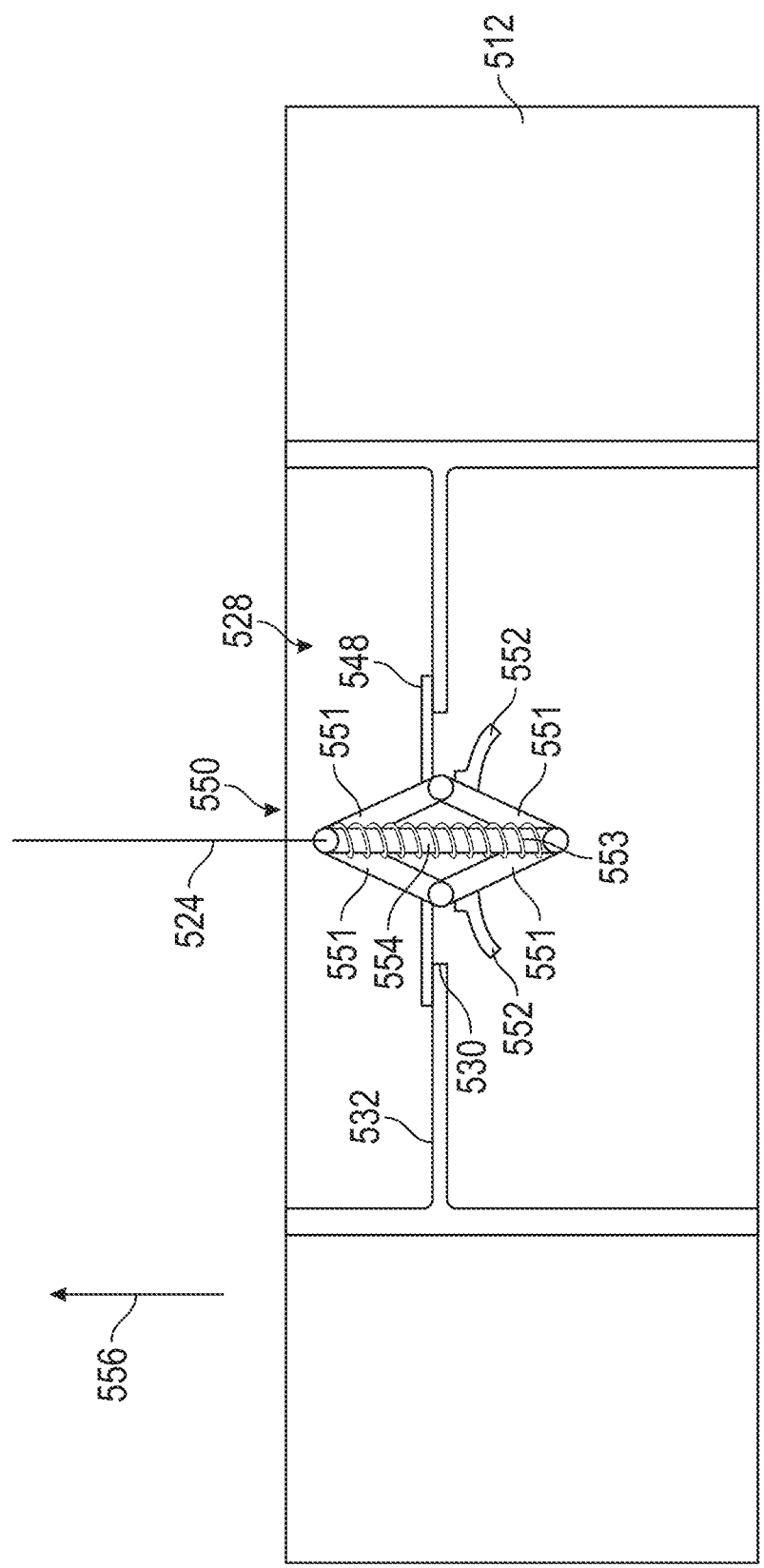

Referring now to FIGS. 8A and 8B another non-limiting fixture 528 is illustrated. In this embodiment, the fixture 528 includes a scissor expansion system that includes a top plate 548, expandable linkage 550 and a pair of arms 552. The expandable linkage comprises a plurality of members 551 each pivotally secured to a central member 553 at one end and at least one other member 551 at an opposite end so that the movement illustrated in FIGS. 8A and 8B can be performed. The scissor expansion system also includes a spring 554 that biases the expandable linkage 550 and the pair of arms 552 to the position illustrated in FIG. 8B where the pair of arms 552 no longer engage portions of the rim 532 about opening 530.

In FIG. 8A there is tension in the cable 524 and the spring 554 is compressed. As such, the expandable linkage 550 and the pair of arms 552 move outward to the position illustrated in FIG. 8A such that they engage portions of the rim 532 about the opening 530. This corresponds to the stowed position or the stowing of the vehicle tire 512.

In FIG. 8B the vehicle tire 512 has been lowered and deployed such that there is enough slack in the cable 524 and thus, the spring 554 can bias the expandable linkage 550 and the pair of arms 552 inward to the position illustrated in FIG. 8B. In this position, the fixture 528 can be removed from the vehicle tire 512 in the direction of arrow 556.

In an alternative, embodiment, the scissor expansion system does not include the spring 554 and movement of the expandable linkage 550 and the pair of arms 552 from the position illustrated in FIG. 8A to FIG. 8B is performed manually when there is slack in the cable 524. In other words, when there is no tension in cable 524 and the fixture 528 can move to the position illustrated in FIG. 8B. Thereafter, tension applied to the cable 524 will move the fixture from the position illustrated in FIG. 8B to the position illustrated in FIG. 8A.

Figure 9:
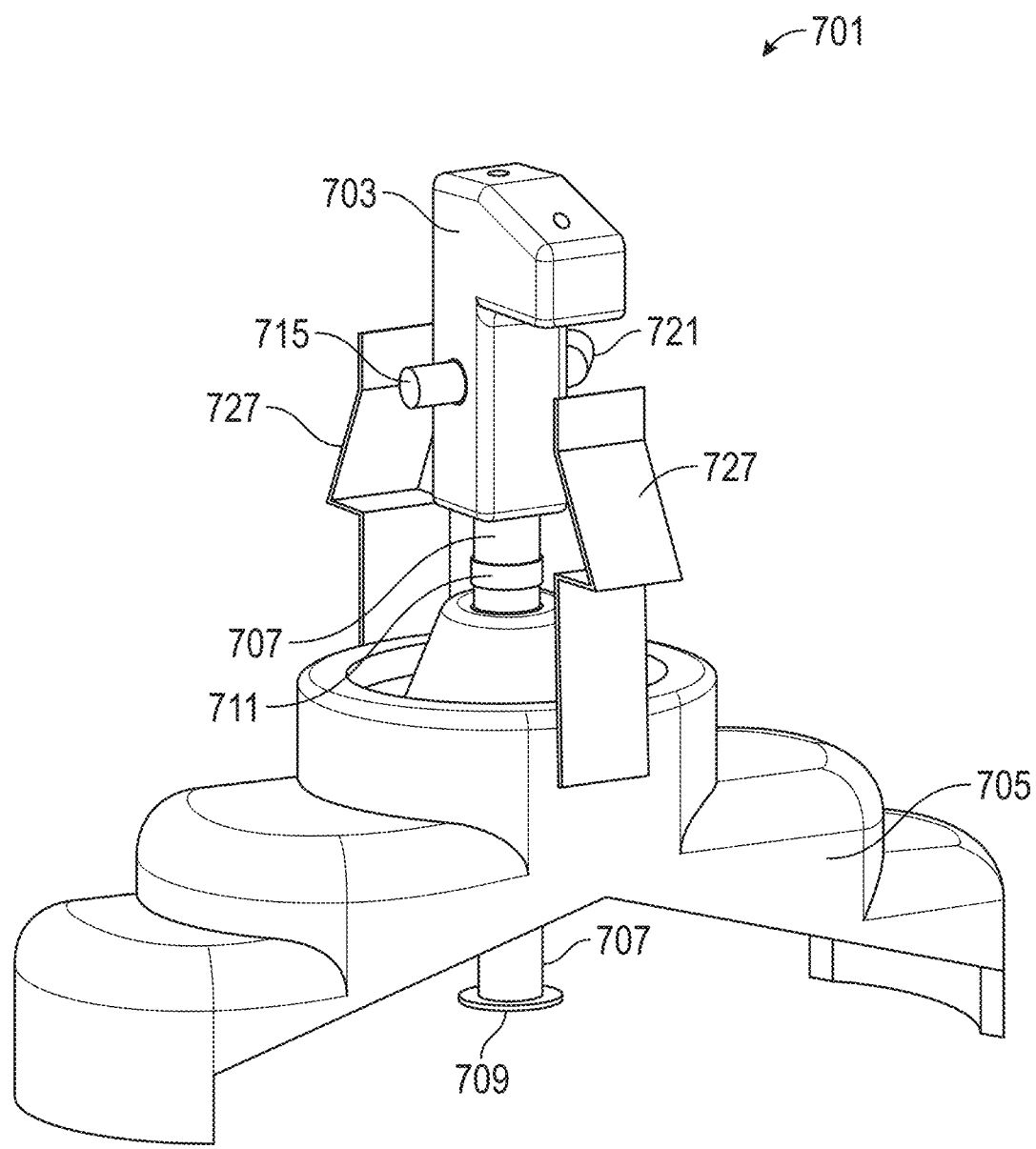
FIG. 9 is a perspective view of another mechanism for releasably engaging a rim of a vehicle tire.
Figure 10:
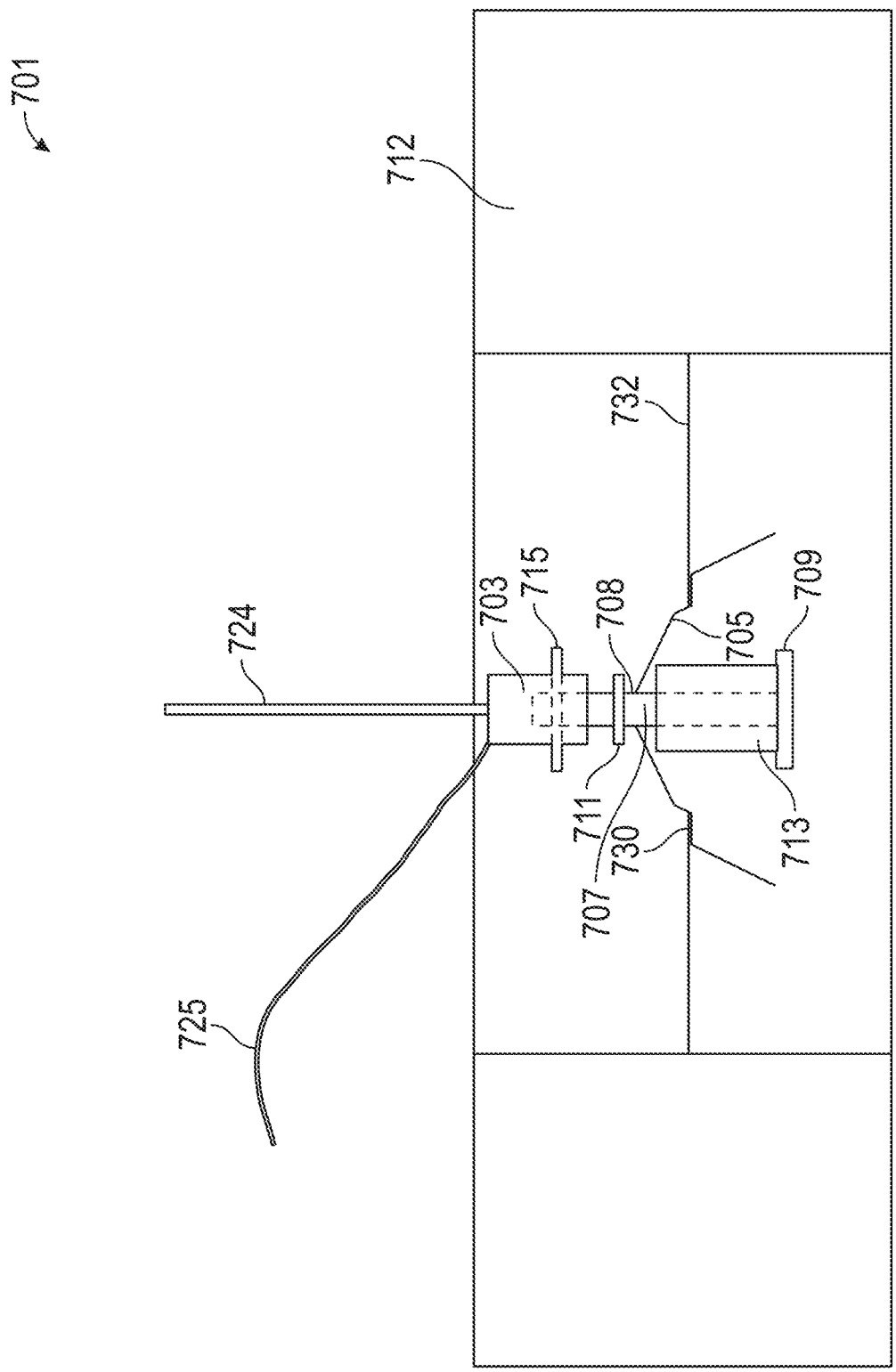
FIG. 10 is a cross-sectional view illustrating the mechanism of FIG. 9 engaging a vehicle tire.
Figure 11:
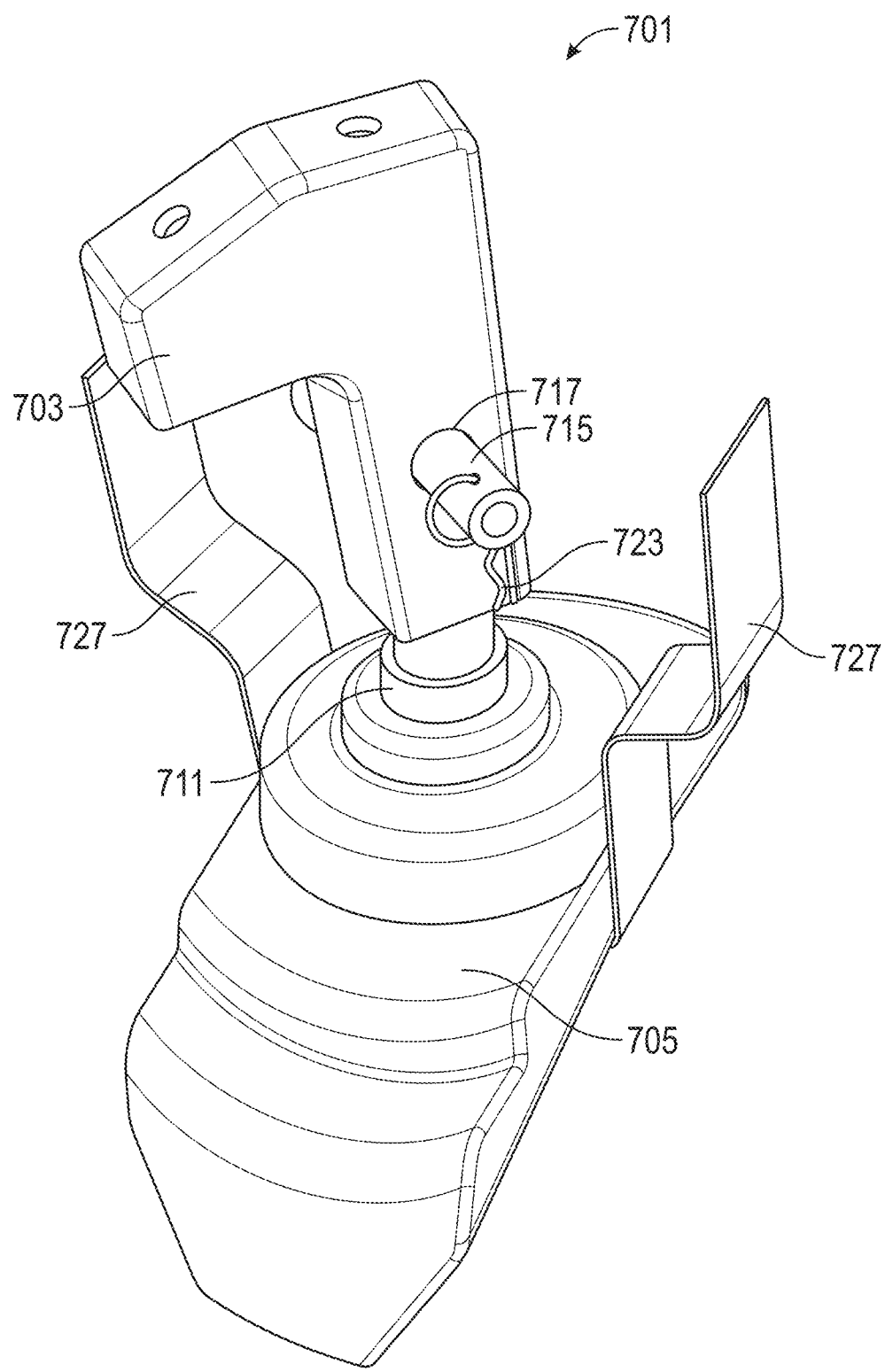
FIG. 11 is a perspective view of the mechanism of FIG. 9 with a cable fastener secured thereto.
Figure 12:
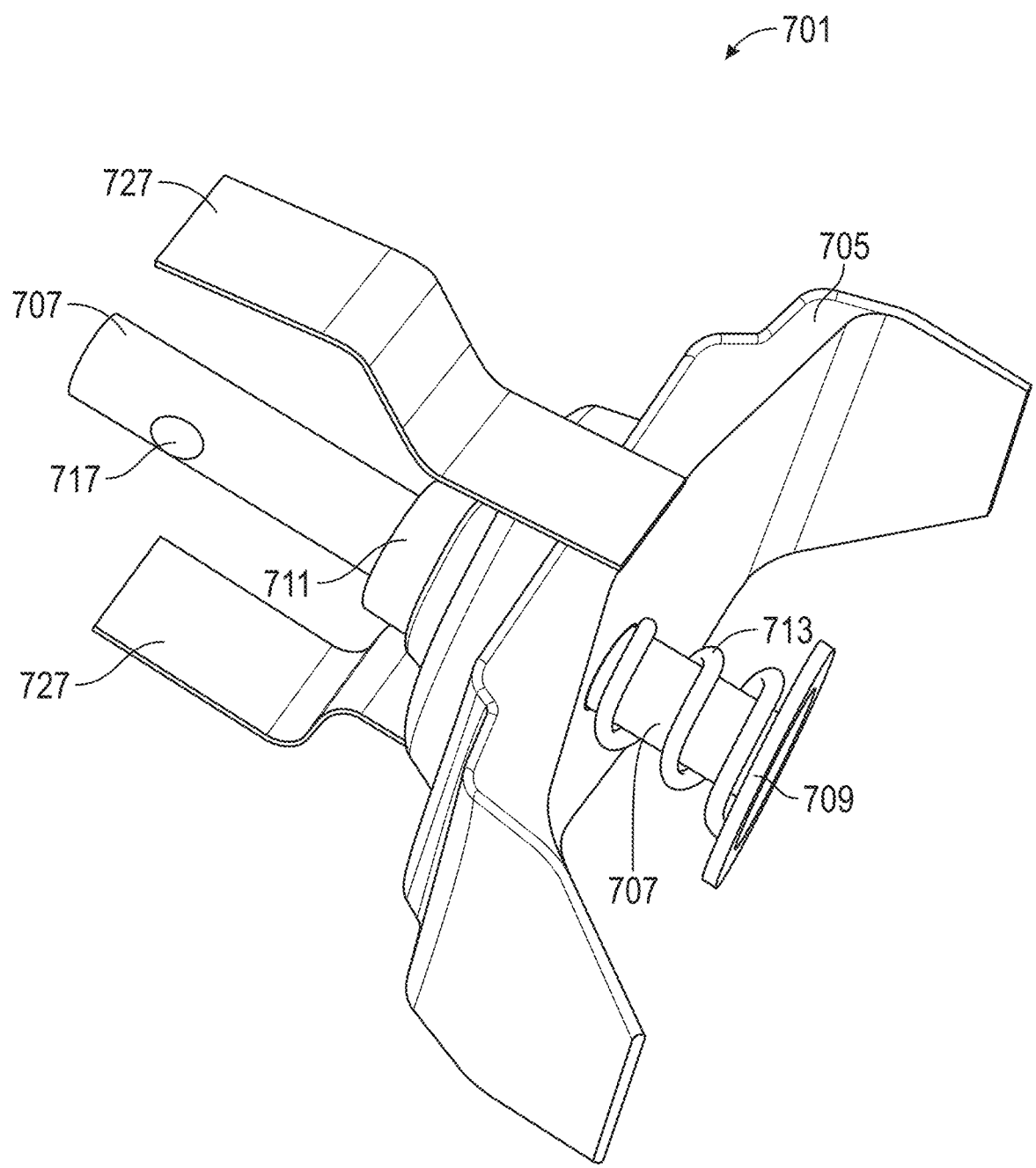
FIG. 12 is another perspective view of the mechanism of FIG. 9.

Referring now to FIGS. 9-12 a mechanism or fixture or assembly 701 for releasably engaging a rim 732 of a vehicle tire 712 is illustrated. The mechanism or fixture 701 is configured to releasably engage an opening 730 of the rim 732. FIG. 9 is a perspective view of the mechanism or fixture 701 and FIG. 10 is a cross-sectional view illustrating the mechanism or fixture 701 of FIG. 9 engaging the vehicle tire 712. FIG. 11 is a perspective view of the mechanism or fixture 701 of FIG. 9 with a cable fastener secured 703 thereto. FIG. 12 is another perspective view of the mechanism or fixture 701.

The mechanism or fixture 701 includes a main body portion 705 configured to engage opening 730 of the rim 732 of the vehicle tire 712. A pin 707 is slidably received within an opening 708 of the main body portion 705. The pin 707 has a flange portion 709 at one end and a collar portion 711 located away from the flange portion. The flange portion 709 is located at one side of the opening 708 of the main body portion 705 while the collar portion 711 is located at an opposite side of the opening 708 of the main body portion 705 so that the pin 707 can slide within the opening 708 of the main body portion 705 but not pass completely therethrough.

In addition, a spring 713 is provided between flange portion 709 and the main body portion 705. The spring 713 is larger than the opening 708 of the main body portion 705 thus a biasing force is provided between the pin 707 and the main body portion 705. The biasing force allowing vibrations to be accommodated for during stowage of the vehicle tire 712 under the vehicle.

The cable fastener 703 is releasably secured to the pin 707 by a pin 715 that slidably engages an opening 717 in the cable fastener 703 and an opening 719 in the pin 707 such that the cable fastener 704 can be releasably secured to the pin 707. Pin 715 will in one embodiment have a curved end 721 a cotter pin 723 to removably secure the pin 715 to the cable fastener 704 and the pin 707 as is known in the related arts.

Cable fastener 703 is secured to a cable 724 and may have a second cable 725 secured thereto such as in the embodiment illustrated in FIGS. 4A-4B. Portions of cables 724 and 725 are illustrated in at least FIG. 10. Of course, the mechanism or fixture 701 of FIGS. 9-12 may be used in any of the aforementioned embodiments.

In order to releasably engage the main body portion 705 of the mechanism or fixture 701 to the opening 730 of the rim 732 of the vehicle tire 712 while the cable fastener 703 is secured to the pin 715 the main body portion 705 will also include a pair of spring tabs 727 that are secured to the main body portion 705. The spring tabs 727 are capable of being deflected from the main body portion 705 towards each other so that they can pass through opening 730 of the rim 732 of the vehicle tire 712 and then after the force biasing the spring tabs 727 is released once they are passed through opening 730 they will return to their unbiased position and retain the main body portion 705 to the rim 732 of the vehicle tire 712. For example, the mechanism or fixture or assembly 701 can have a first configuration where the spring tabs 727 engage the rim 732 of the vehicle tire and a second configuration where they are pushed towards each other so they can pass through the opening 730 in the rim 732 of the vehicle tire 712. The spring tabs 727 may be pushed together by a user's hand or hand or by pushing the spring tabs 727 through opening 730 as the spring tabs in one non-limiting embodiment may have an angular configuration that engages the periphery of opening 730 as they are inserted therethrough. Thereafter, after the force pushing the spring tabs 727 together is removed they will spring back to their unbiased position such that they engage the opening 730 of the rim 732 of the vehicle tire 712. In one non-limiting embodiment, the spring tabs may be formed from metal or steel that is capable of providing the desired biasing force as well as being capable of being deflected.

As such, this mechanism or fixture 701 can be releasably engage the rim 732 of the vehicle tire 712 via spring tabs 727 and the cable fastener 703 can be secured or removed from pin 707 of the mechanism or fixture 701. This allows for stowing and release of the vehicle tire 712 as described in the embodiment of FIGS. 4A-4B or in any of the above described embodiments.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An apparatus for stowing and deploying a vehicle tire from a rear portion of a vehicle, comprising:
a raising and lowering mechanism for moving the vehicle tire a stowed position to a deployed position, the vehicle tire when in the deployed position is lowered and extended laterally in order to provide access to the vehicle tire, and wherein the raising and lowering mechanism includes a motor for winding and unwinding a first cable and a second cable from a dual diameter cable drum, wherein the first cable lowers the vehicle tire from the stowed position and the second cable moves the vehicle tire laterally from the stowed position.

2. The apparatus as in claim 1, wherein the raising and lowering mechanism including a motor for winding and unwinding a cable from a drum.

3. The apparatus as in claim 2, wherein the cable is secured to a fixture at one end and the drum at another end, the fixture being configured to prevent it from passing through an opening in a rim of the vehicle tire when there is tension on the cable and allow it to be manipulated and pass through the opening in the rim of the vehicle tire when there is slack in the cable.

4. The apparatus as in claim 1, further comprising a latch in order to retain the vehicle tire in the stowed position.

5. The apparatus as in claim 4, wherein a switch is provided to operate the raising and lowering mechanism as well as the latch.

6. An apparatus for stowing and deploying a vehicle tire from a rear portion of a vehicle, comprising:
a raising and lowering mechanism for moving the vehicle tire a stowed position to a deployed position, the vehicle tire when in the deployed position is lowered and extended laterally in order to provide access to the vehicle tire, and, wherein the raising and lowering mechanism includes a fixture for releasably engaging a rim of the vehicle tire, the fixture is configured to releasably engage an opening of the rim, the fixture including:
a main body portion configured to engage the opening of the rim of the vehicle tire;
a pin slidably received within an opening of the main body portion;
a flange portion secured to one end of the pin and a collar portion secured to the pin and located away from the flange portion, the flange portion is located at one side of the opening of the main body portion and the collar portion is located at an opposite side of the opening of the main body portion so that the pin can slide within the opening of the main body portion but not pass completely therethrough;
a spring located between the flange portion and the main body portion, the spring being larger than the opening of the main body portion, the spring providing a biasing force between the pin and the main body portion;

a cable fastener releasably secured to the pin by another pin that slidably engages an opening in the cable fastener and an opening in the pin such that the cable fastener can be releasably secured to the pin, the cable fastener being secured to at least one cable of the raising and lowering mechanism; and a pair of spring tabs secured to the main body portion, the spring tabs are capable of being deflected from the main body portion towards each other so that they can pass through the opening of the rim of the vehicle tire and then after a force biasing the spring tabs toward each other is removed after they are passed through the opening of the rim of the vehicle tire they will return to their an unbiased position and retain the main body portion to the rim of the vehicle tire.

7. The apparatus as in claim 6, wherein the raising and lowering mechanism including a motor for winding and unwinding a cable from a drum.

8. The apparatus as in claim 6, further comprising a latch in order to retain the vehicle tire in the stowed position.

9. The apparatus as in claim 8, wherein a switch is provided to operate the raising and lowering mechanism as well as the latch.

10. An apparatus for stowing and deploying a vehicle tire from a rear portion of a vehicle, comprising:

a raising and lowering mechanism for moving the vehicle tire a stowed position to a deployed position, the vehicle tire when in the deployed position is lowered and extended laterally in order to provide access to the vehicle tire, and, wherein the raising and lowering mechanism includes:

a motor for winding and unwinding a first cable and a second cable from a dual diameter cable drum, wherein the first cable lowers the vehicle tire from the stowed position and the second cable moves the vehicle tire laterally from the stowed position;

a fixture for releasably engaging a rim of the vehicle tire, the fixture is configured to releasably engage an opening of the rim, the fixture including:

a main body portion configured to engage the opening of the rim of the vehicle tire;

a pin slidably received within an opening of the main body portion;

a flange portion secured to one end of the pin and a collar portion secured to the pin and located away from the flange portion, the flange portion is located at one side of the opening of the main body portion and the collar portion is located at an opposite side of the opening of the main body portion so that the pin can slide within the opening of the main body portion but not pass completely therethrough;

a spring located between the flange portion and the main body portion, the spring being larger than the opening of the main body portion, the spring providing a biasing force between the pin and the main body portion;

a cable fastener releasably secured to the pin by another pin that slidably engages an opening in the cable fastener and an opening in the pin such that the cable fastener can be releasably secured to the pin, the cable fastener being secured to the first cable and the second cable; and a pair of spring tabs secured to the main body portion, the spring tabs are capable of being deflected from the main body portion towards each other so that they can pass through the opening of the rim of the vehicle tire and then after a force biasing the spring tabs toward each other is removed after they are passed through the opening of the rim of the vehicle tire they will return to their an unbiased position and retain the main body portion to the rim of the vehicle tire.

11. The apparatus as in claim 10, further comprising a latch in order to retain the vehicle tire in the stowed position.

12. The apparatus as in claim 11, wherein a switch is provided to operate the raising and lowering mechanism as well as the latch.

* * * * *